US012681302B2

(12) United States Patent　　　(10) Patent No.:　US 12,681,302 B2
Kano et al.　　　　　　　　　　　　(45) Date of Patent:　　　Jul. 14, 2026

(54) VIRTUAL IMAGE OPTICAL SYSTEM, AND VIRTUAL IMAGE DISPLAY DEVICE AND ON-VEHICLE SYSTEM INCLUDING VIRTUAL IMAGE OPTICAL SYSTEM

(71) Applicant: CANON KABUSHIKI KAISHA, Tokyo (JP)

(72) Inventors: Hiroto Kano, Tochigi (JP); Takayuki Sugiyama, Tochigi (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 18/472,120

(22) Filed: Sep. 21, 2023

(65) Prior Publication Data

US 2024/0118544 A1　　Apr. 11, 2024

Related U.S. Application Data

(63) Continuation of application No. PCT/JP2022/010502, filed on Mar. 10, 2022.

(30) Foreign Application Priority Data

Mar. 24, 2021　(JP) ................................. 2021-050220

(51) Int. Cl.
　　*G02B 27/01*　　　(2006.01)
　　*B60K 35/10*　　　(2024.01)
　　　　　　　(Continued)

(52) U.S. Cl.
　　CPC .......... *G02B 27/0149* (2013.01); *B60K 35/10* (2024.01); *B60K 35/211* (2024.01);
　　　　　　　(Continued)

(58) Field of Classification Search
　　CPC .... B60K 35/10; B60K 35/211; B60K 35/233; B60K 35/235; B60K 35/28; B60K 2360/23; B60K 2360/31; B60K 2360/334; B60K 2360/347; G02B 17/0816; G02B 26/0816; G02B 27/01; G02B 27/0101; G02B 27/0149; G02B 27/0179; G02B 2027/0136; G02B 2027/0154; G02B 2027/0163; G02B 2027/0181
　　See application file for complete search history.

(56) References Cited

U.S. PATENT DOCUMENTS

2018/0157036 A1　6/2018　Choi et al.
2019/0025580 A1*　1/2019　Nagano .................. B60K 35/00
2021/0199945 A1*　7/2021　You ...................... G02B 21/364

FOREIGN PATENT DOCUMENTS

CN　　108919494　A　11/2018
JP　　2017226251　A　12/2017
　　　　　(Continued)

*Primary Examiner* — Cory A Almeida
(74) *Attorney, Agent, or Firm* — Canon U.S.A., Inc. IP Division

(57) ABSTRACT

A virtual image optical system includes first and second optical elements and each configured to guide light from a display unit, wherein the second optical element guides the light from the display unit to a first pupil to form a first virtual image, and the second optical element simultaneously guides the light from the display unit to a second pupil to form a second virtual image, and wherein decentering of the second optical element enables switching of positions of the first pupil and the second pupil to each other.

19 Claims, 21 Drawing Sheets

(51) Int. Cl.

| | |
|---|---|
| *B60K 35/21* | (2024.01) |
| *B60K 35/233* | (2024.01) |
| *B60K 35/235* | (2024.01) |
| *B60K 35/28* | (2024.01) |
| *G02B 17/08* | (2006.01) |
| *G02B 26/08* | (2006.01) |

(52) U.S. Cl.
CPC .......... *B60K 35/233* (2024.01); *B60K 35/235* (2024.01); *B60K 35/28* (2024.01); *G02B 17/0816* (2013.01); *G02B 26/0816* (2013.01); *G02B 27/0101* (2013.01); *G02B 27/0179* (2013.01); *B60K 2360/23* (2024.01); *B60K 2360/31* (2024.01); *B60K 2360/334* (2024.01); *B60K 2360/347* (2024.01); *G02B 2027/0136* (2013.01); *G02B 2027/0154* (2013.01); *G02B 2027/0163* (2013.01); *G02B 2027/0181* (2013.01)

(56) References Cited

FOREIGN PATENT DOCUMENTS

| | | | |
|---|---|---|---|
| JP | 2019056840 A | 4/2019 | |
| JP | 2020098236 A | 6/2020 | |

* cited by examiner

VIRTUAL IMAGE OPTICAL SYSTEM, AND VIRTUAL IMAGE DISPLAY DEVICE AND ON-VEHICLE SYSTEM INCLUDING VIRTUAL IMAGE OPTICAL SYSTEM

CROSS-REFERENCE TO RELATED APPLICATIONS

This application is a Continuation of International Patent Application No. PCT/JP2022/010502, filed Mar. 10, 2022, which claims the benefit of Japanese Patent Application No. 2021-050220, filed Mar. 24, 2021, both of which are hereby incorporated by reference herein in their entirety.

BACKGROUND OF THE INVENTION

Field of the Invention

The present invention relates to a virtual image optical system suitable for a virtual image display device for displaying a virtual image of an image.

Background Art

In a movable apparatus such as a vehicle, a virtual image display device, such as a head-up display (HUD), which forms a virtual image of an image displayed by a display means in a space to thereby enable an occupant (user) to visually recognize the image has heretofore been used. With the virtual image display device, the image can be displayed in front of a windshield of a vehicle when viewed from the occupant, and the image can be superimposed on a surrounding environment of the vehicle.

There may be a case where, when the occupant's viewpoint is changed, for example, when the occupant visually checks a vehicle at a distance farther than the virtual image, excellent visibility cannot be obtained. Patent Literature 1 discusses a virtual image display device configured to form a plurality of virtual images respectively corresponding to a plurality of viewpoints of an occupant by guiding light beams from a plurality of display means to the occupant using reflective surfaces.

CITATION LIST

Patent Literature

PTL 1: Japanese Patent Application Laid-Open No. 2020-98236

However, in the virtual image display device discussed in PTL 1, there is a need to simultaneously guide light beams from a plurality of display means to the occupant without any interference, which makes it difficult to simplify an optical system or to miniaturize each reflective surface.

Accordingly, there is a need to provide a virtual image optical system capable of achieving excellent visibility with a simple configuration.

SUMMARY OF THE INVENTION

According to an aspect of the present invention, a virtual image optical system includes first and second optical elements each configured to guide light from a display means, wherein the second optical element guides the light from the display means to a first pupil to form a first virtual image, and the second optical element simultaneously guides the light from the display means to a second pupil to form a second virtual image, and wherein decentering of the second optical element enables switching of positions of the first pupil and the second pupil to each other.

Further features of the present invention will become apparent from the following description of exemplary embodiments with reference to the attached drawings.

BRIEF DESCRIPTION OF THE DRAWINGS

FIG. 4A is a schematic view of a virtual image display device according to a first modification.

FIG. 9 is a schematic view of a virtual image display device according to a fifth modification.

FIG. 10B is a schematic view of the major part of the virtual image display device according to the first numerical example (first state).

FIG. 16 is a schematic view of a major part of a virtual image display device according to a fourth numerical example (first state).

FIG. 18 is a schematic view of an on-vehicle system and a movable apparatus according to an embodiment.

DESCRIPTION OF THE EMBODIMENTS

Figure 1:
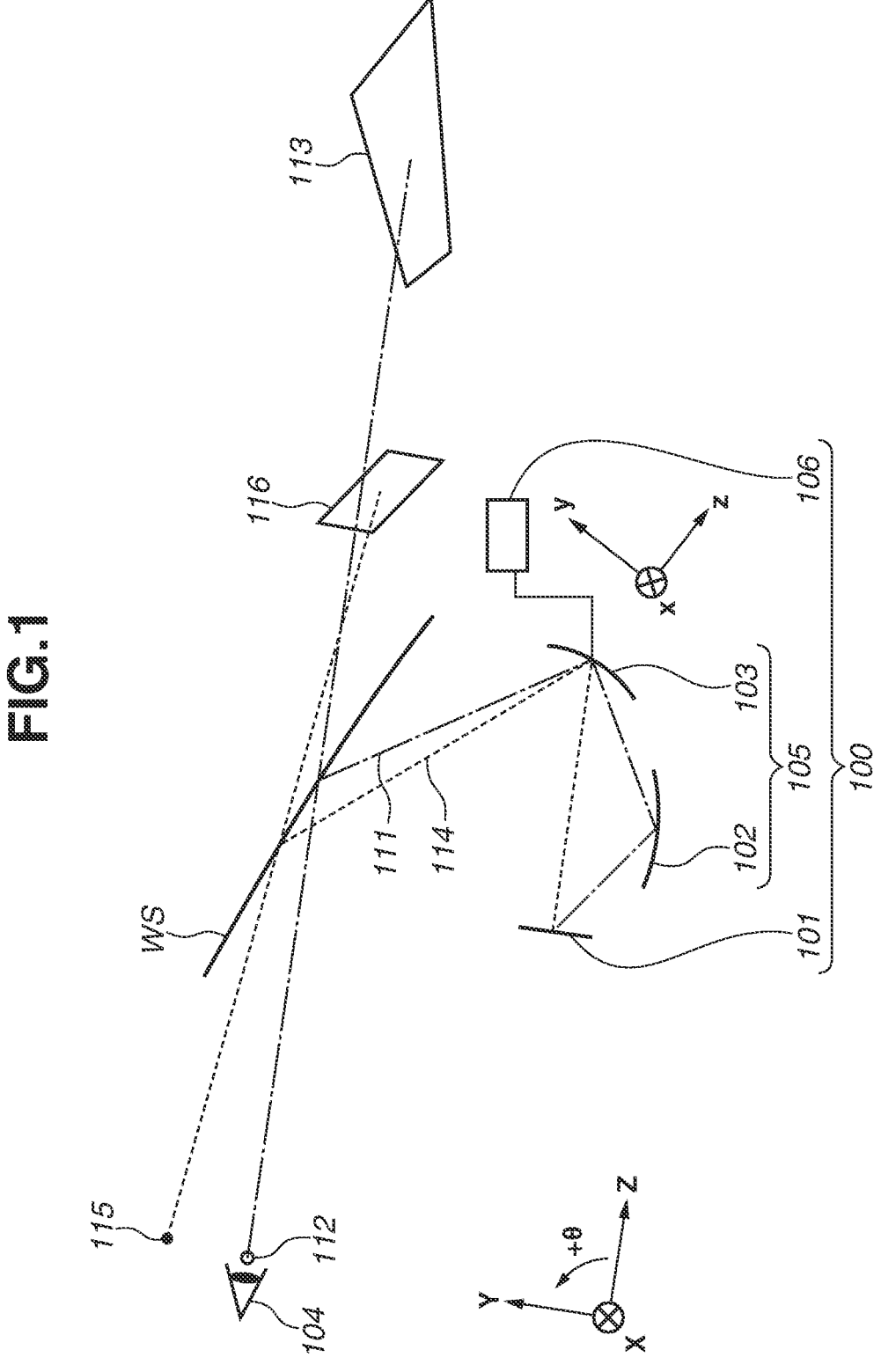
FIG. 1 is a schematic view of a virtual image display device according to a first embodiment (first state).

Preferred exemplary embodiments of the present invention will be described below with reference to the drawings. Note that the drawings may be drawn in different scales from actual ones in some cases for the sake of convenience. In the drawings, the same members are denoted by the same reference numeral, and duplicate descriptions are omitted.

First Exemplary Embodiment

Figure 2:
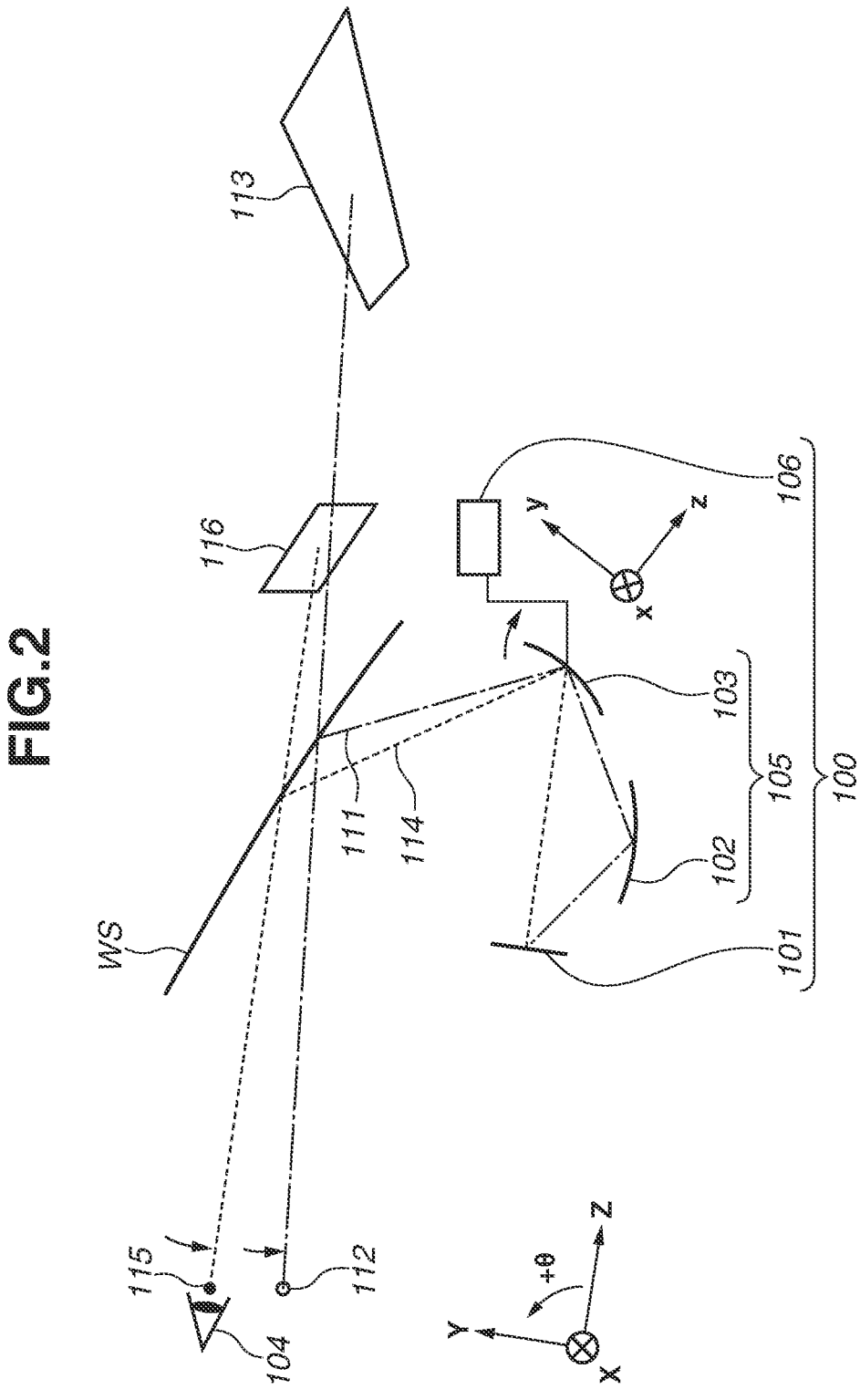
FIG. 2 is a schematic view of the virtual image display device according to a first embodiment (second state).

FIGS. 1 and 2 are schematic views (Y-Z sectional views) of a virtual image display device 100 according to a first exemplary embodiment of the present invention. The virtual image display device 100 includes a display means (display unit) 101 that displays an image, a virtual image optical system 105 that forms a first virtual image 113 and a second virtual image 116 of the image displayed on a display surface of the display means 101, and a driving means (switching means) 106. FIGS. 1 and 2 illustrate only an optical path (reference axis) of a principal ray (reference light beam) in a light flux from the display means 101 that passes through the center of a pupil on a reduction side (object side) of the virtual image optical system 105 and reaches the center of a pupil (eye box) on an enlargement side (image side). The principal ray does not in fact reach the position of each of the virtual images, but FIGS. 1 and 2 also illustrate an optical path of an imaginary principal ray reaching the center of each of the virtual images visually recognized by a user.

The virtual image display device 100 forms the first virtual image 113 and the second virtual image 116 of the image displayed on the display means 101, thereby enabling the user to recognize as if the formed image is displayed in front of a windshield WS. This makes it possible to, for example, superimpose the image on a surrounding environment (external environment) in front of the windshield WS.

As the display means 101, a display element (spatial modulation element), such as a liquid crystal panel, can be used. For example, a liquid crystal display (LCD), a liquid crystal on silicon (LCOS), and a digital mirror device (DMD) can be adopted as the display means 101. Alternatively, a screen that displays an image projected by a projection means (not illustrated) may be adopted. The display surface of the display means 101 corresponds to an object plane (reduction plane) of the virtual image optical system 105. The present exemplary embodiment assumes a case where the display means 101 is composed of a single display element, but instead the display means 101 may be composed of a plurality of display elements. For example, first and second display elements corresponding to the first virtual image 113 and the second virtual image 116, respectively, may be provided.

The windshield WS is an optical member provided on a movable body (movable apparatus), such as an automobile (vehicle), on which the virtual image display device 100 is mounted. The windshield WS reflects light from the virtual image display device 100 toward an eye 104 of the user (occupant of the movable apparatus), and transmits light from an outside world toward the user. A transmissive/reflective surface of the windshield WS may be a flat surface or a curved surface as long as the transmissive/reflective surface has a shape that matches the shape of the movable apparatus. A combiner (half mirror) that is a member different from the windshield WS may be adopted as an optical member having the same function as the windshield WS. The virtual image display device 100 may directly guide light to the user's eye 104, not via the windshield WS, as needed.

The virtual image optical system 105 includes first and second optical elements that guide light from the display means 101. As each of the optical elements, a refractive element including a refractive surface, or a reflective element including a reflective surface can be adopted. The virtual image optical system 105 according to the present exemplary embodiment is composed of a first reflective element 102 (first reflective surface) serving as the first optical element, and a second reflective element 103 (second reflective surface) serving as the second optical element. A mirror, a prism, or the like can be adopted as each refractive element. An aspheric surface, such as a free-form surface, may also be used, as needed. While the present exemplary embodiment assumes a configuration in which each reflective element has a single reflective surface formed thereon, a reflective element having a plurality of reflective surfaces formed thereon may be adopted. For example, the first reflective element 102 and the second reflective element 103 may be integrated into a single reflective element.

The virtual image optical system 105 may include an optical member, for example, a refractive element or a reflective/refractive element, such as a lens or a prism, or a plate glass (cover glass), as needed. The virtual image optical system 105 may desirably have a positive power in an entire system to form each virtual image, and may have a non-power or negative power reflective surface. If there is an optical path where a virtual image is formed by only one reflective surface (second reflective element 103) as in the present exemplary embodiment, at least the reflective surface needs to have a positive power. However, this is not the case if the windshield WS has a positive power.

Next, features of the virtual image optical system 105 according to the present exemplary embodiment will be described. The virtual image optical system 105, by using the first reflective element 102 and the second reflective element 103, guides the light from the display means 101 to a first pupil 112, thereby forming the first virtual image 113. At the same time, the virtual image optical system 105, by using the second reflective element 103, guides the light from the display means 101 to a second pupil 115 without using the first reflective element 102, thereby forming the second virtual image 116. Thus, the virtual image optical system 105 can simultaneously form a plurality of virtual images of the image displayed on the display means 101.

Then, the second reflective element 103 according to the present exemplary embodiment is provided to be capable of being decentered (tilted or shifted). The term "tilting" used herein refers to change of an angle formed between a reference axis (optical axis) and a normal line to the reflective surface of the second reflective element 103 at an intersection with the reference axis (a tilt of the normal line to the reflective surface of the second reflective element 103). The term "shifting" refers to change of the position of the second reflective element 103. Decentering the second reflective element 103 makes it possible to change an incident angle and a reflection angle of the light from the display means 101 with respect to the reflective surface of the second reflective element 103. However, in the case of shifting the second reflective element 103, only a light reflection position may be changed so as to prevent the incident angle and the reflection angle of the light with respect to the second reflective element 103 from being changed.

The decentering of the second reflective element 103 that contributes to formation of both the first virtual image 113 and the second virtual image 116 allows positions of the first pupil 112 and the second pupil 115 to be simultaneously changed in a direction including a component of a direction perpendicular to the optical axis. Accordingly, the decentering of the second reflective element 103 makes it possible to switch the positions of the first pupil 112 and the second pupil 115 with each other and to switch an object to be virtually recognized by the user between the first virtual image 113 and the second virtual image 116. Also, in a case where the second optical element is a refractive element, decentering of the refractive element makes it possible to switch the positions of the first pupil 112 and the second pupil 115 to each other.

FIG. 1 illustrates a first state where the virtual image display device 100 causes the user to visually recognize the first virtual image 113. In the first state, the light from the display means 101 is guided to the enlargement side by the first reflective element 102 and the second reflective element 103 and reaches the user's eye 104 via the windshield WS. In the first state, the tilt and position of the second reflective element 103 are set such that the position of the first pupil 112 corresponds to the position of the user's eye 104. In other words, in the first state, the user cannot visually recognize the second virtual image 116.

On the other hand, FIG. 2 illustrates a second state where the virtual image display device 100 causes the user to visually recognize the second virtual image 116. In the second state, the light from the display means 101 is guided to the enlargement side by the second reflective element 103 without using the first reflective element 102, and reaches the user's eye 104 via the windshield WS. In the second state, the tilt and position of the second reflective element 103 are set such that the position of the second pupil 115 corresponds to the position of the user's eye 104. In other words, in the second state, the user cannot visually recognize the first virtual image 113.

Thus, the virtual image optical system 105 can simultaneously form the first virtual image 113 and the second virtual image 116 based on the light from the display means 101, and can switch the positions of the first virtual image 113 and the second virtual image 116 to each other by decentering the second reflective element 103. With this configuration, the position of a virtual image to be displayed can be switched with the change in the user's viewpoint, without increasing the size of the second reflective element 103. Consequently, it is possible to achieve excellent visibility while simplifying the virtual image optical system 105.

In the present embodiment, the driving means 106 causes the second reflective element 103 to be decentered. As the driving means 106, for example, an actuator such as a motor, and an operation means that non-electrically decenters the second reflective element 103 by a user operation can be adopted. The driving means 106 causes the second reflective element 103 to be decentered based on a signal (information) from an external control means, thereby making it possible to switch between the first state and the second state as described above. Further, the driving means 106 may also function as a control means. In this case, for example, the driving means 106 may include a processor, such as a central processing unit (CPU). This configuration enables the driving means 106 to control decentering of the second reflective element 103.

In the present exemplary embodiment, the display surface of the display means 101 is perpendicular to a first reference axis (first optical axis) 111 in the first state. However, the display surface may be non-perpendicular to the first reference axis 111, as needed. For example, the display surface may be tilted so as to prevent, if light from the outside world, such as sunlight, is incident on the display surface, the light from being regularly reflected by the display surface and from reaching the user's eye 104. In the present exemplary embodiment, the display surface of the display means 101 and the second reflective element 103 are disposed so as to oppose each other. This configuration allows the light from the display means 101 to be directly incident on the second reflective element 103 (without using another reflective surface) during formation of the second virtual image 116, thereby making it possible to further simplify the virtual image optical system 105.

In the present exemplary embodiment, the distance from the first pupil 112 to the first virtual image 113 is longer than the distance from the second pupil 115 to the second virtual image 116. Accordingly, in a case where the user's line of sight is directed toward an object near the user (e.g., a vehicle ahead), for example, when the movable apparatus stops (when the vehicle stops), the second state may be desirably set, and in a case where the user's line of sight is directed toward an object away from the user (a traffic light, a sign, etc.), the first state may be desirably set. This configuration makes it possible to reduce the distance between the outside world visually recognized by the user and a virtual image, thereby reducing the user's load of changing the user's line of sight.

Further, the virtual image optical system 105 according to the present embodiment is configured to decenter the first virtual image 113 with respect to the first reference axis (first optical axis) 111 that passes through the center of the first virtual image 113, i.e., a straight line connecting the center of the first pupil 112 and the center of the first virtual image 113. Specifically, the shape, tilt, and position of the first reflective element 102 are designed so that the first virtual image 113 is non-perpendicular to the first reference axis 111. Thus, when the user's line of sight is directed toward an object away from the user in the first state, the first virtual image 113 is satisfactorily superimposed on the outside world, which leads to an improvement in the visibility of the first virtual image 113.

On the other hand, the virtual image optical system 105 according to the present embodiment is configured so that the second virtual image 116 is perpendicular to a second reference axis (second optical axis) 114 that passes through the center of the second virtual image 116, i.e., a straight light connecting the center of the second pupil 115 and the center of the second virtual image 116. Thus, when the user's line of sight is directed toward a nearby object in the second state, the second virtual image 116 is satisfactorily superimposed on the outside world, which leads to an improvement in the visibility of the second virtual image 116. However, the first virtual image 113 may be perpendicular to the first reference axis 111, or the second virtual image 116 may be non-perpendicular to the second reference axis 114, as needed.

Relative to the user, the first reflective element 102 is located on the lower side (−Y side) of the second reflective element 103 in a direction perpendicular to the first reference axis 111 that passes through the center of the first virtual image 113. The lower side relative to the user corresponds to the lower side in the vertical direction, except in particular circumstances where the virtual image display device 100 and the user are upside down (the movable apparatus is upside down). With this configuration, in a case where the first virtual image 113 is decentered as described above, the orientation of the first reflective element 102 can be set to match a decentering direction, thus it is easy to correct aberration in the first virtual image 113. The same applies when the virtual image optical system 105 is located on the upper side (+Y-side) of the user, as in a second exemplary example to be described below.

Image information to be displayed on the display means 101 may be different between the first state and the second state. For example, the shape and position of an image can be changed when the first and second states are switched from one to the other, so as to prevent the occurrence of a distortion or a shift of the center position of the image caused by the switching. This can reduce an uncomfortable feeling given to the user when the first and second states are switched from one to the other. Particularly, in the case of forming a plurality of virtual images with different tilts with respect to the reference axis as in the present embodiment, it is desirable that the image information be different between the first state and the second state.

The user in the first state may not be the same user as the user in the second state. For example, if there is a plurality of users with different sitting heights, the first state and the second state may be switched by decentering the second reflective element 103 upon change of the user. If the relative position between the user's eye 104 and the pupil on the enlargement side of the virtual image optical system 105 is shifted due to change of the user, change of the user's posture, vibrations of the movable apparatus, or the like, the second reflective element 103 may be decentered so as to correct the shift. Specifically, the driving means 106 may cause the second reflective element 103 to be decentered to thereby adjust at least one of the relative position between the first pupil 112 and the user's eye 104 and the relative position between the second pupil 115 and the user's eye 104. In other words, the driving means 106 may function not only as the switching means, but also as an adjustment means.

Figure 3:
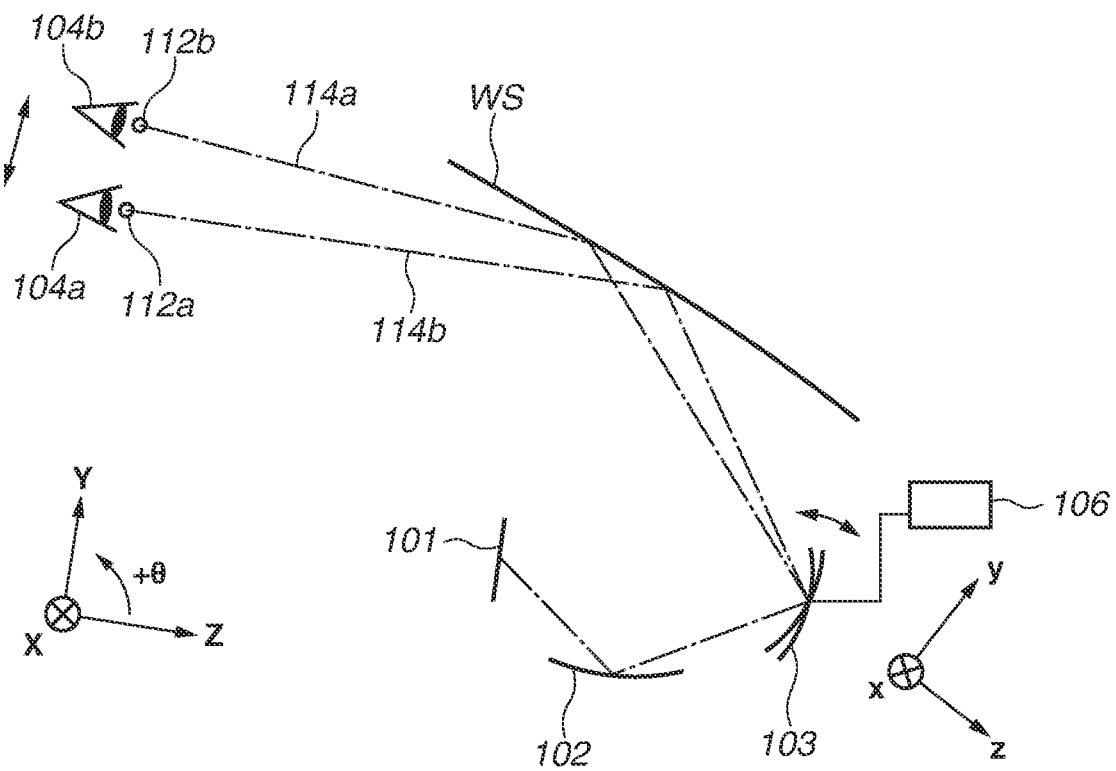
FIG. 3 is an explanatory view of a method for adjusting a pupil position of a virtual image optical system.

FIG. 3 is a view illustrating a method for adjusting the relative position between the first pupil 112 and the user's eye 104 in the first state. In a case where the user's eye 104 is located at a position 104a, if the first pupil 112 is located at a position 112a corresponding to the position 104a, the user can visually recognize the first virtual image 113. However, in a case where the user's eye 104 is shifted in a direction including a component of a direction perpendicular to a first reference axis 114a (Y-direction) and is located at a position 104b, if the first pupil 112 remains at the position 112a, the user cannot visually recognize the first virtual image 113.

Accordingly, the driving means 106 causes the second reflective element 103 to be decentered to move the first pupil 112 to a position 112b, which is the position corresponding to the position 104b of the user's eye 104. Thus, the adjustment of the relative position between the first pupil 112 and the user's eye 104 by decentering the second reflective element 103 enables the user to visually recognize the first virtual image 113 even when the position of the user's eye 104 is changed. In the same way, in the second state, the adjustment of the relative position between the second pupil 115 and the user's eye 104 by decentering the second reflective element 103 enables the user to visually recognize the second virtual image 116.

In the present exemplary embodiment, both the switching of the positions of the first pupil 112 and the second pupil 115, and the adjustment of the relative position between each of the first pupil 112 and the second pupil 115 and the user's eye 104 can be performed by the second reflective element 103, which is a single (common) member. This configuration eliminates the need for separately providing the means of switching the pupils and the means of adjusting the position of each pupil. Consequently, it is possible to achieve excellent visibility while reducing the number of components constituting the virtual image display device 100 and simplifying the entire apparatus.

To simplify the virtual image optical system 105, the number of reflective surfaces located on a first optical path corresponding to the first pupil 112 may be desirably different from the number of reflective surfaces located on a second optical path corresponding to the second pupil 115. As described above, in the virtual image optical system 105 according to the present exemplary embodiment, the first reflective element 102 and the second reflective element 103 are located on the first optical path, and only the second reflective element 103 is located on the second optical path. In other words, the second reflective element 103 contributes to formation of both the first virtual image 113 and the second virtual image 116, while the first reflective element 102 contributes to formation of only the first virtual image 113.

Thus, the use of the common reflective surface (second reflective element 103) to be decentered on the first and second optical paths makes it possible to reduce the number of components, while the reflective surface located only on one of the optical paths (first reflective element 102) makes it possible to appropriately form the virtual images. For example, as described above, the virtual images with different positions, shapes, and the like can be formed by, for example, making the first virtual image 113 located farther from the user to be non-perpendicular to the first reference axis 111 and making the second virtual image 116 located closer to the user to be perpendicular to the second reference axis 114.

The number of reflective surfaces to be located on the first optical path may be the same as the number of reflective surfaces to be located on the second optical paths, as needed. For example, another reflective surface may be provided between the display means 101 and the second reflective element 103 on the second optical path. However, to simplify the entire system, it may be desirable to configure the virtual image optical system 105 so that reflective surfaces other than the second reflective element 103 are not provided on the second optical path. Specifically, one of the optical paths may be desirably provided with only a mirror to be decentered, and the other optical path may be desirably provided with a plurality of mirrors including the mirror to be decentered. Further, the virtual image optical system 105 may be desirably composed of two reflective surfaces. Specifically, the virtual image optical system 105 may desirably have a configuration in which two reflective surfaces are located on one of the optical paths and one reflective surface is located on the other optical path.

Figure 4A:
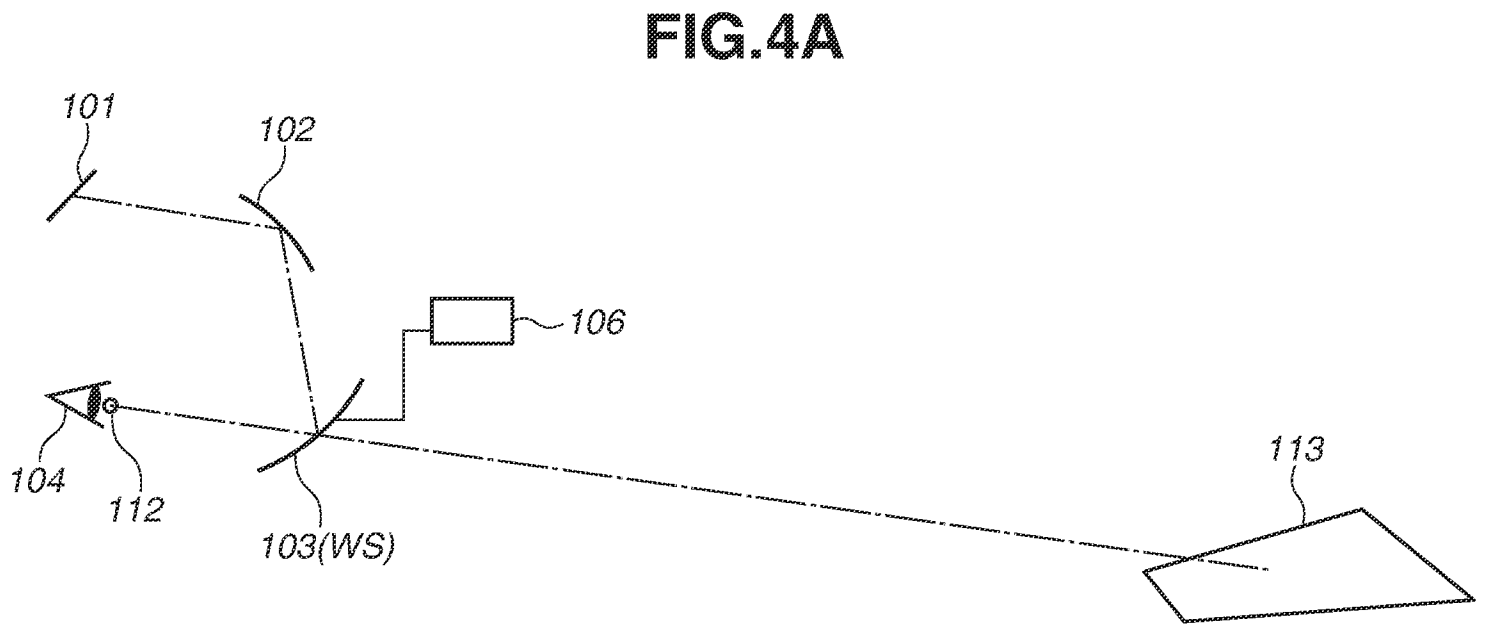
Figure 4B:
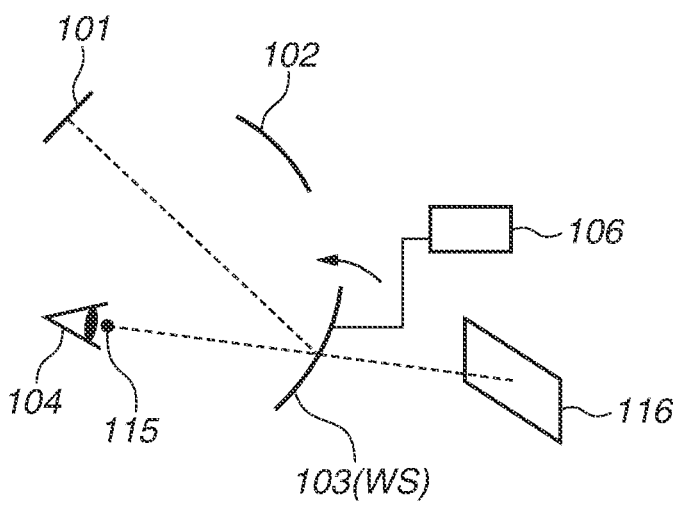
FIG. 4B is a schematic view of the virtual image display device according to the first modification.

FIGS. 4A and 4B are schematic views each illustrating a first modification of the virtual image display device 100 according to the present embodiment. FIG. 4A illustrates the first state where the position of the user's eye 104 matches the position of the first pupil 112. FIG. 4B illustrates the second state where the position of the user's eye 104 matches the position of the second pupil 115. The first modification has a configuration in which the second reflective element 103 functions as the windshield WS. In other words, the second reflective element 103 is configured to transmit light from the opposite side of an incident side of light from the display means 101. This configuration can reduce the number of components of the entire apparatus.

Figure 5:
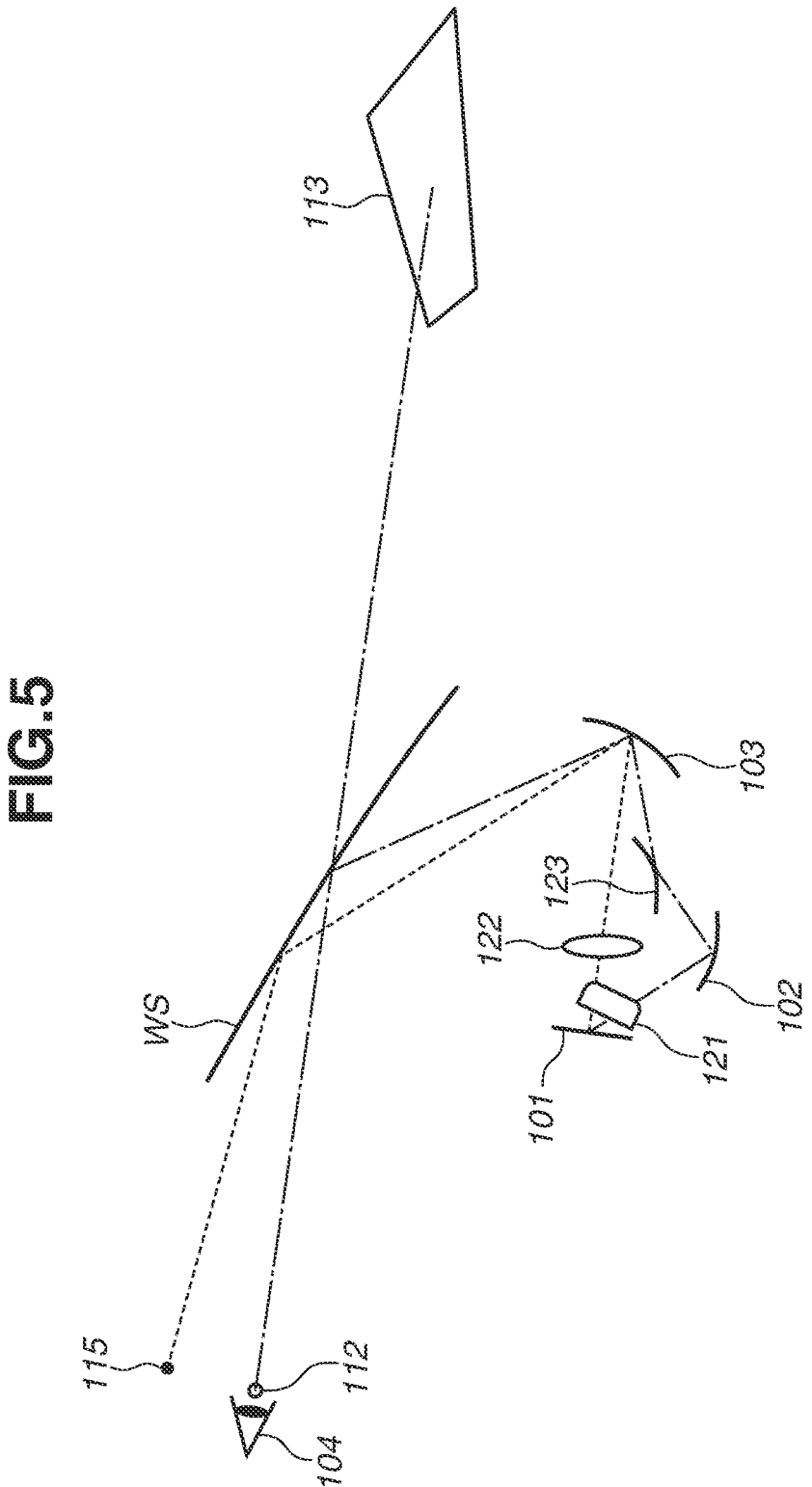
FIG. 5 is a schematic view of a virtual image display device according to a second modification.

FIG. 5 is a schematic view illustrating a second modification of the virtual image display device 100 according to the present exemplary embodiment. In the second modification, a third reflective surface 123 is located on an optical path between the first reflective element 102 and the second reflective element 103. Thus, the number of reflective surfaces constituting the virtual image optical system 105 is not limited to two. The same effect can be obtained if three or more reflective surfaces are used. Alternatively, the virtual image optical system 105 may be composed of a single reflective element (only the second reflective element 103) if the configuration of the display means 101 is devised and the second reflective element 103 is irradiated with a plurality of light beams corresponding to the pupils. However, to obtain more excellent optical performance, it may be desirable to provide at least one optical element that guides at least one of the plurality of light beams corresponding to the pupils to the second reflective element 103, in addition to the second reflective element 103. As the at least one optical element, not only the reflective element, such as the first reflective element 102 illustrated in FIG. 1, but also the refractive element, such as refractive elements (lenses) 121 and 122 illustrated in FIG. 5, may be used.

Second Exemplary Embodiment

Figure 6:
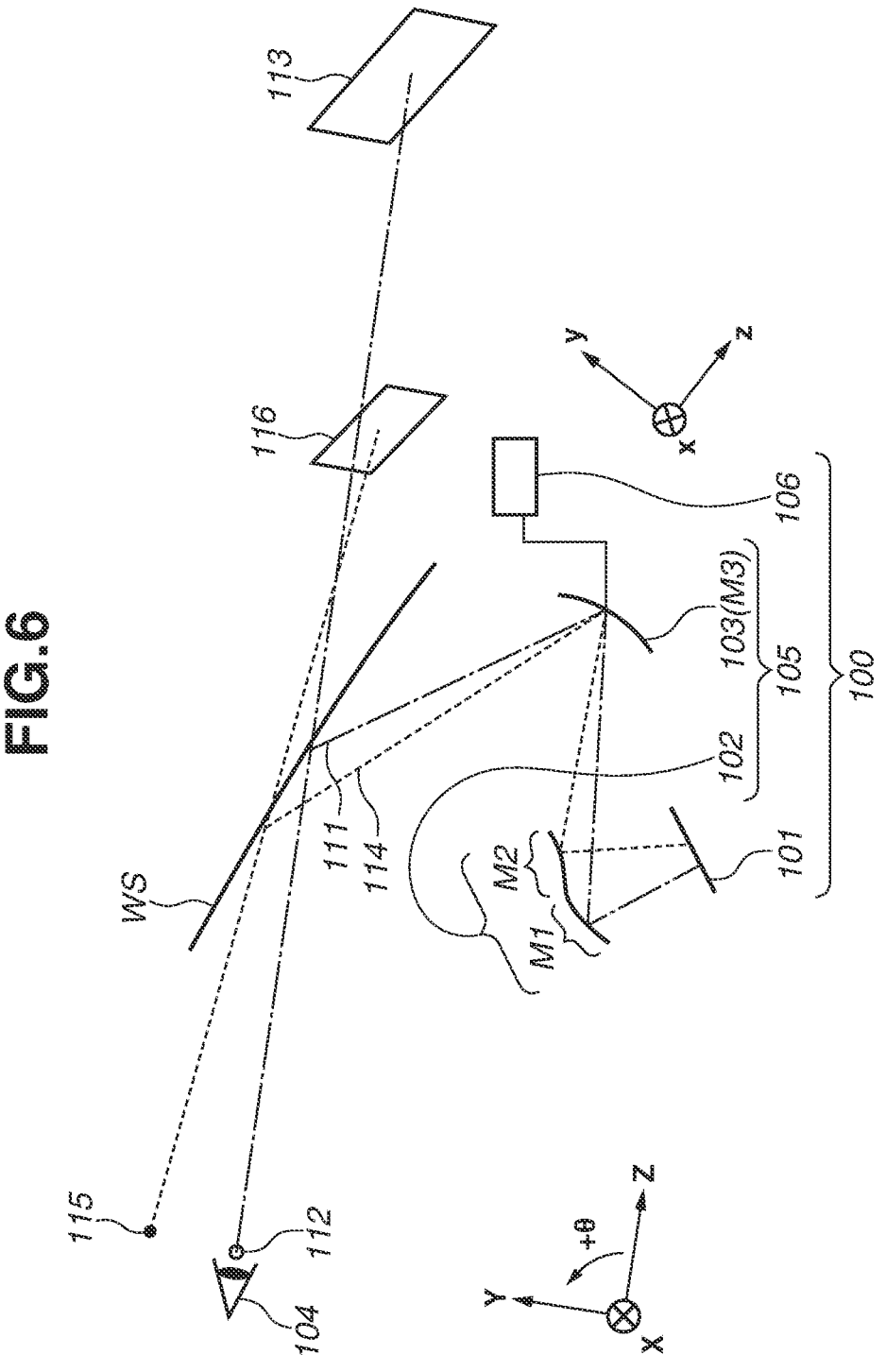
FIG. 6 is a schematic view of the virtual image display device according to the second modification.

FIG. 6 is a schematic view of a virtual image display device 100 according to a second exemplary embodiment. Descriptions of components in the virtual image display device 100 according to the present exemplary embodiment that are similar to those of the virtual image display device 100 according to the first exemplary embodiment described above are omitted.

The virtual image optical system 105 according to the present exemplary embodiment is composed of the first reflective element 102 and the second reflective element 103 that reflect light from the display means 101. The first reflective element 102 includes a first reflective surface M1 that guides light to the first pupil 112, and a second reflective surface M2 that guides light to the second pupil 115. The second reflective element 103 includes a third reflective surface M3 that guides light to each of the first pupil 112 and the second pupil 115.

The virtual image optical system 105 guides the light from the display means 101 to the first pupil 112 using the first reflective surface M1 and the third reflective surface M3, thereby forming the first virtual image 113. At the same time, the virtual image optical system 105 guides the light from the display means 101 to the second pupil 115 using the second reflective surface M2 and the third reflective surface M3, thereby forming the second virtual image 116.

Thus, in the present exemplary embodiment, unlike in the first embodiment, the virtual images can be aligned in the same up/down orientation by setting the same number of reflections on each optical path leading to the corresponding pupil. In other words, there is no need to perform processing of turning the image to be displayed on the display means 101 upside down when the user visually recognizes one of the virtual images.

As illustrated in FIG. 6, in the present exemplary embodiment, the first reflective surface M1 is a concave surface and the second reflective surface M2 is a convex surface. In other words, the front surface of the first reflective element 102 is an aspheric surface having an inflection point. Thus, in the present exemplary embodiment, the first reflective surface M1 and the second reflective surface M2 are provided on the same reflective element, which leads to a reduction in the number of components of the entire apparatus. However, the reflective surfaces may be provided on different (separate) reflective elements, as needed.

Third Exemplary Embodiment

Figure 7:
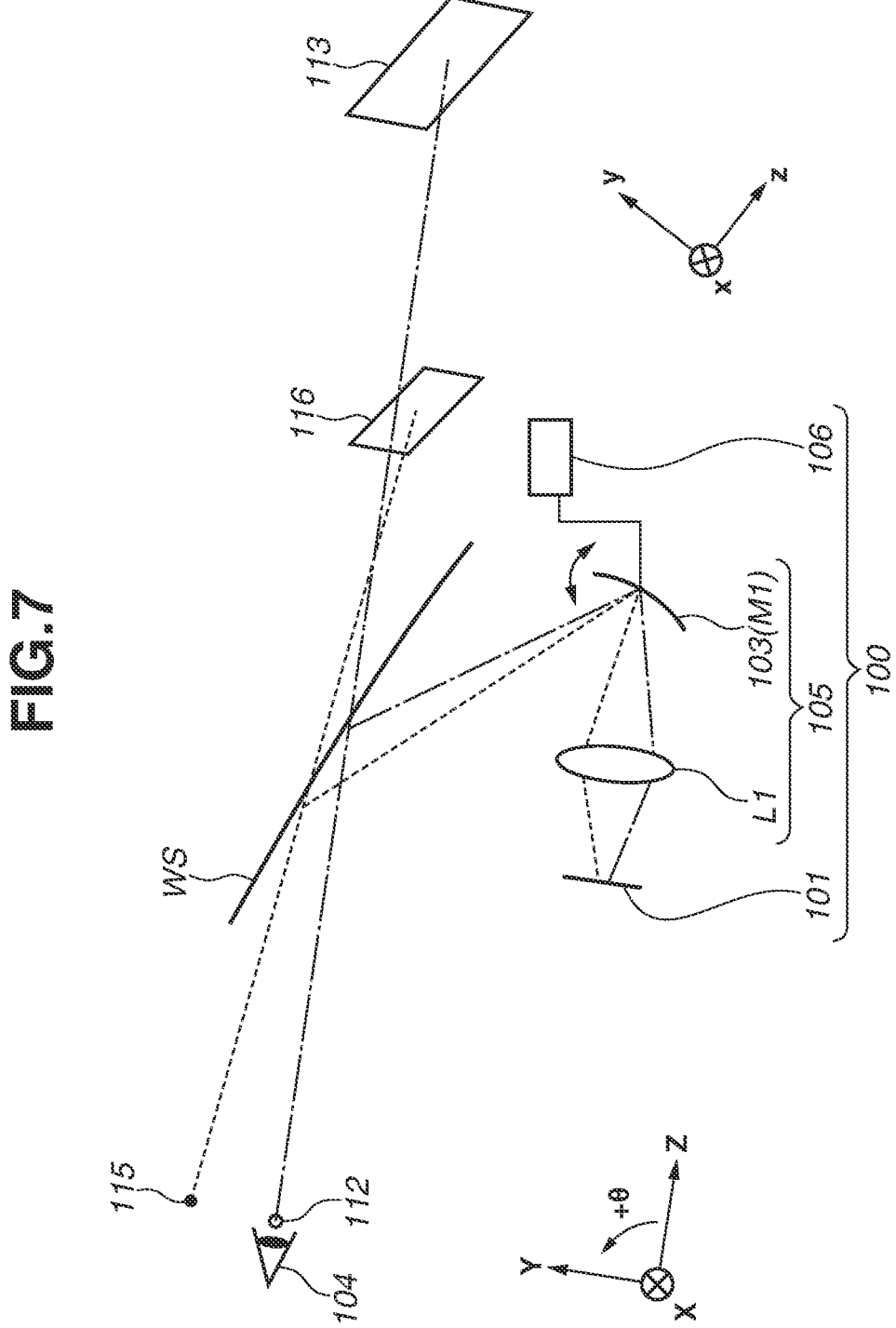
FIG. 7 is a schematic view of a virtual image display device according to a third modification.

FIG. 7 is a schematic view of a virtual image display device 100 according to a third exemplary embodiment.

Descriptions of components in the virtual image display device 100 according to the present exemplary embodiment that are similar to those of the virtual image display device 100 according to the first exemplary embodiment described above are omitted.

The virtual image optical system 105 according to the present exemplary embodiment is composed of a refractive element L1 that refracts light from the display means 101, and a reflective element 103 including a reflective surface M1. The virtual image optical system 105 guides light from the display means 101 to the first pupil 112 using a lower portion of the refractive element L1 and the reflective surface M1, thereby forming the first virtual image 113. At the same time, the virtual image optical system 105 guides light from the display means 101 to the second pupil 115 using an upper portion of the refractive element L1 and the reflective surface M1, thereby forming the second virtual image 116.

Thus, in the present exemplary embodiment, unlike in the first embodiment, the use of the refractive element makes it possible to reduce the total length of each optical path. While the common refractive element L1 is adopted for each optical path in the present exemplary embodiment, a different (separate) refractive element may be disposed on each optical path. Alternatively, a plurality of refractive elements may be disposed on one optical path. The refractive element is not limited to a positive lens as illustrated in FIG. 7. A negative lens may be disposed, as needed, and the refractive surface (lens surface) may be an aspheric surface such as a free-form surface.

Fourth Exemplary Embodiment

Figure 8:
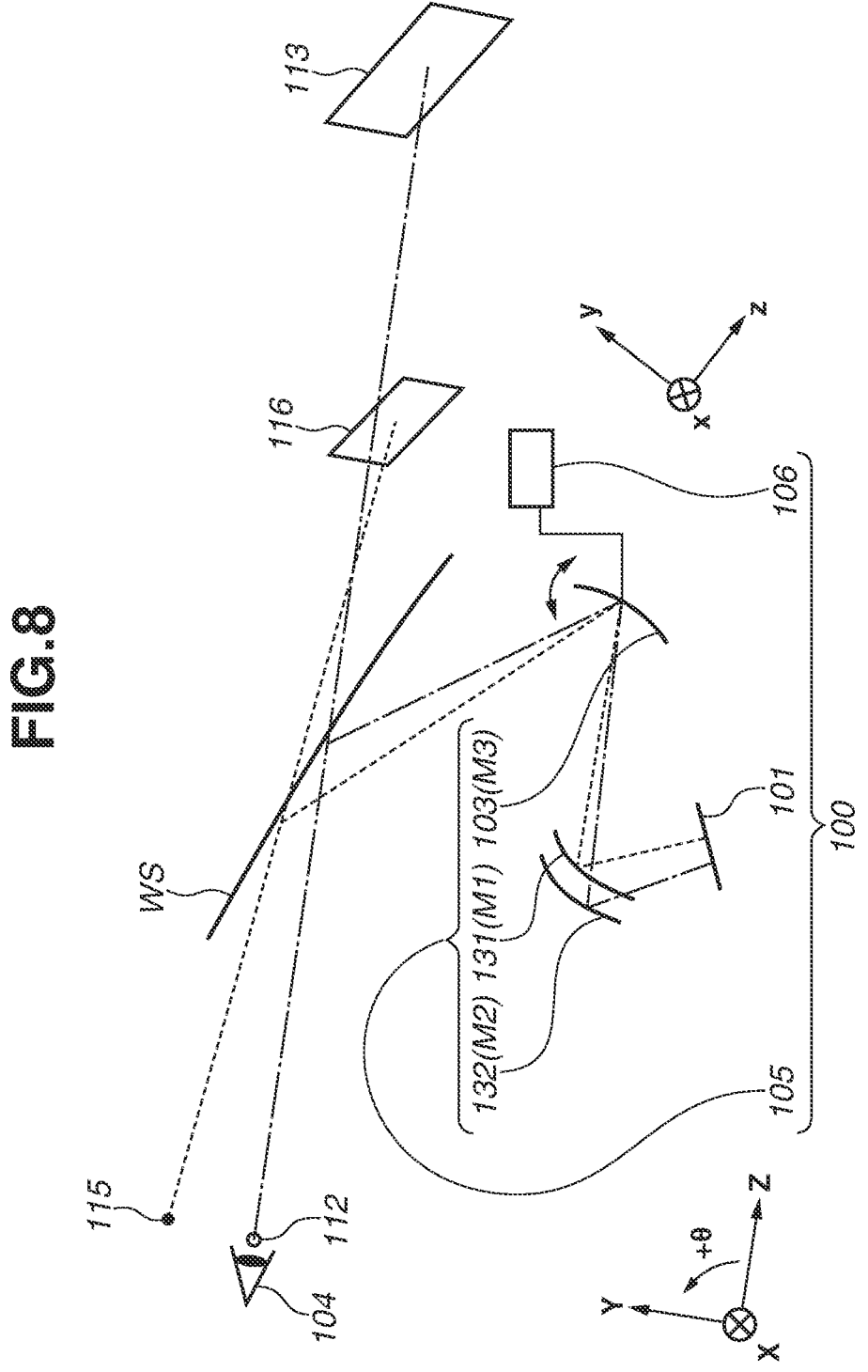
FIG. 8 is a schematic view of a virtual image display device according to a fourth modification.

FIG. 8 is a schematic view of a virtual image display device 100 according to a fourth exemplary embodiment. Descriptions of components in the virtual image display device 100 according to the present exemplary embodiment that are similar to those of the virtual image display device 100 according to the first exemplary embodiment described above are omitted.

The virtual image optical system 105 according to the present exemplary embodiment is composed of a first reflective element 131 including the first reflective surface M1, which reflects and transmits light from the display means 101, a second reflective element 132 including the second reflective surface M2, and the third reflective element 103 including the third reflective surface M3. The virtual image optical system 105 guides light that is output from the display means 101 and is transmitted through the first reflective surface M1 to the first pupil 112 using the second reflective surface M2 and the third reflective surface M3, thereby forming the first virtual image 113. At the same time, the virtual image optical system 105 guides light from the display means 101 to the second pupil 115 using the first reflective surface M1 and the third reflective surface M3, thereby forming the second virtual image 116.

Thus, in the present exemplary embodiment, unlike in the first exemplary embodiment, the adoption of the reflective element (reflective/transmissive element) including the reflective surface (reflective/transmissive surface) that reflects and transmits light makes it possible to secure a difference in optical path length between the optical paths with a smaller space and to achieve miniaturization of the entire apparatus.

As the first reflective element 131, for example, a partially reflective mirror provided with a reflective film formed only on a portion of a translucent member that corresponds to the second pupil 115, a perforated mirror having an opening formed only on a portion corresponding to the first pupil 112, or the like can be adopted. Alternatively, a half mirror that reflects a part of incident light and transmits the remaining light, a dichroic mirror that reflects light of a specific wavelength and transmits the remaining light, a polarization mirror that reflects light in a specific polarization state and transmits the remaining light, or the like may be adopted. Alternatively, a liquid crystal element or electrochromic element that switches between reflecting and transmitting light by being applied with a voltage may be adopted.

In the present exemplary embodiment, the first reflective surface M1 and the second reflective surface M2 are provided on different reflective elements, but instead the first reflective surface M1 and the second reflective surface M2 may be provided on the same reflective element (reflective/transmissive element).

Fifth Exemplary Embodiment

Figure 9:
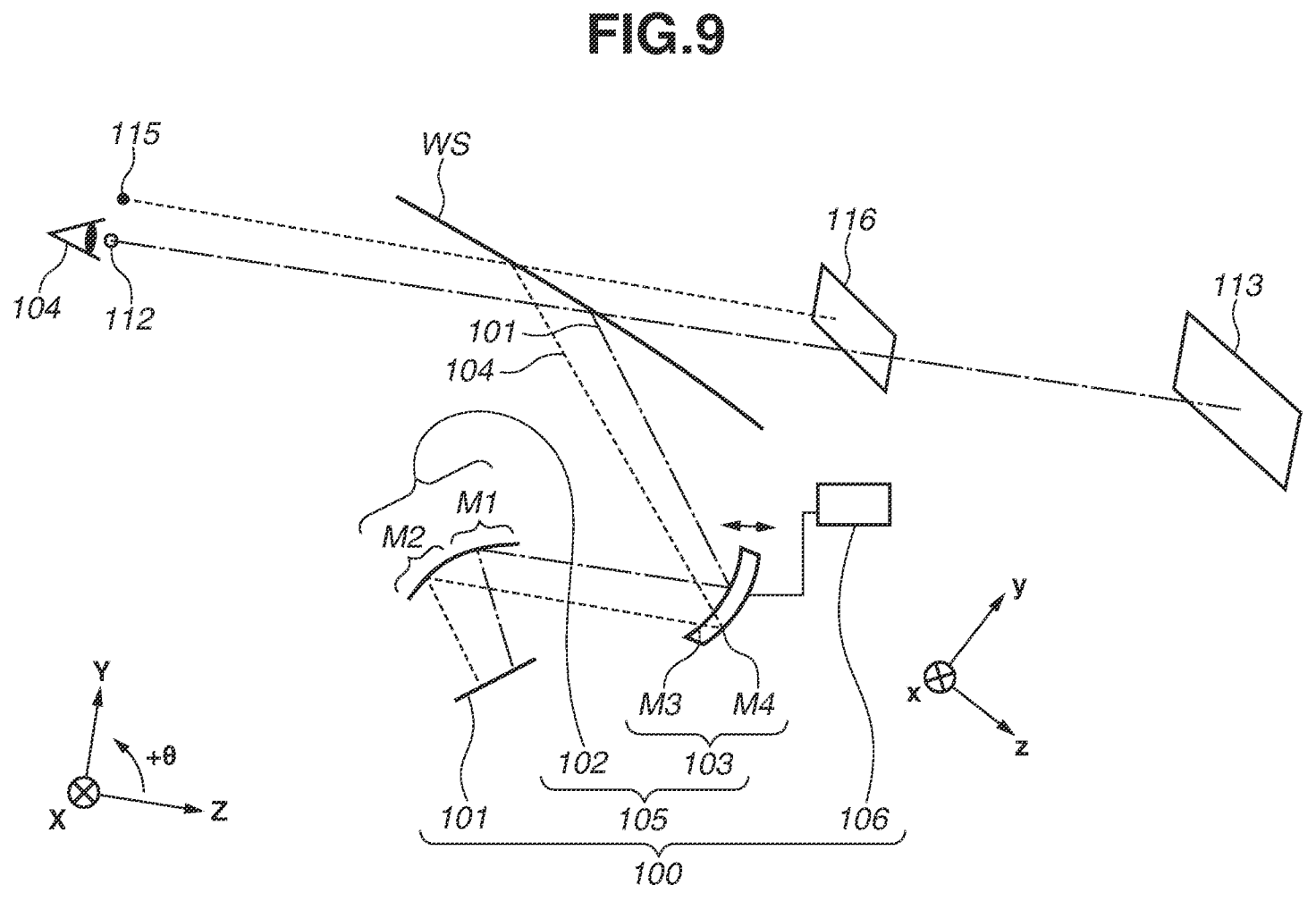

FIG. 9 is a schematic view of a virtual image display device 100 according to a fifth exemplary embodiment. Descriptions of components in the virtual image display device 100 according to the present exemplary embodiment that are similar to those of the virtual image display device 100 according to the first exemplary embodiment described above are omitted.

The virtual image optical system 105 according to the present exemplary embodiment is composed of the first reflective element 102 that reflects light from the display means 101 and the second reflective element 103 that reflects and transmits light. The first reflective element 102 includes the first reflective surface M1 that guides light to the first pupil 112, and the second reflective surface M2 that guides light to the second pupil 115. The second reflective element 103 includes the third reflective surface M3 that guides light to the first pupil 112, and a fourth reflective surface M4 that guides light to the second pupil 115.

The virtual image optical system 105 guides light from the display means 101 to the first pupil 112 using the first reflective surface M1 and the third reflective surface M3, thereby forming the first virtual image 113. At the same time, the virtual image optical system 105 guides light from the display means 101 to the second pupil 115 using the second reflective surface M2, the third reflective surface M3, and the fourth reflective surface M4, thereby forming the second virtual image 116. Thus, in the present exemplary embodiment, unlike in the first embodiment, the second reflective element (reflective/transmissive element) 103 including the third reflective surface M3 as the reflective surface (reflective/transmissive surface) that reflects and transmits light is adopted. This configuration makes it possible to secure the difference in optical path length between the optical paths with a smaller space and to achieve miniaturization of the entire apparatus, similar to the fourth exemplary embodiment.

The third reflective surface M3 can be configured in the same manner as the first reflective surface M1 of the fourth exemplary embodiment. In the present exemplary embodiment, the third reflective surface M3 and the fourth reflective surface M4 are provided on the same reflective element, but instead the third reflective surface M3 and the fourth reflective surface M4 may be provided on different reflective elements, as needed. In the present exemplary embodiment, the positions of the first pupil 112 and the second pupil 115 are switched by shifting the second reflective element 103, instead of tilting the second reflective element 103.

NUMERICAL EXAMPLES

Figure 10A:
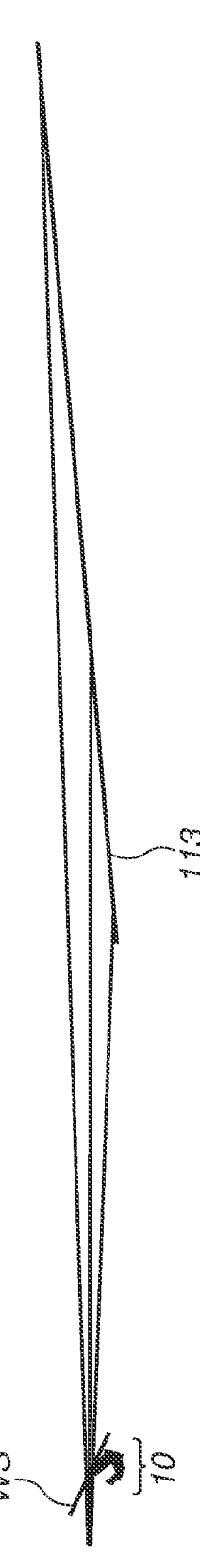
FIG. 10A is a schematic view of a major part of a virtual image display device according to a first numerical embodiment (first state).
Figure 10B:
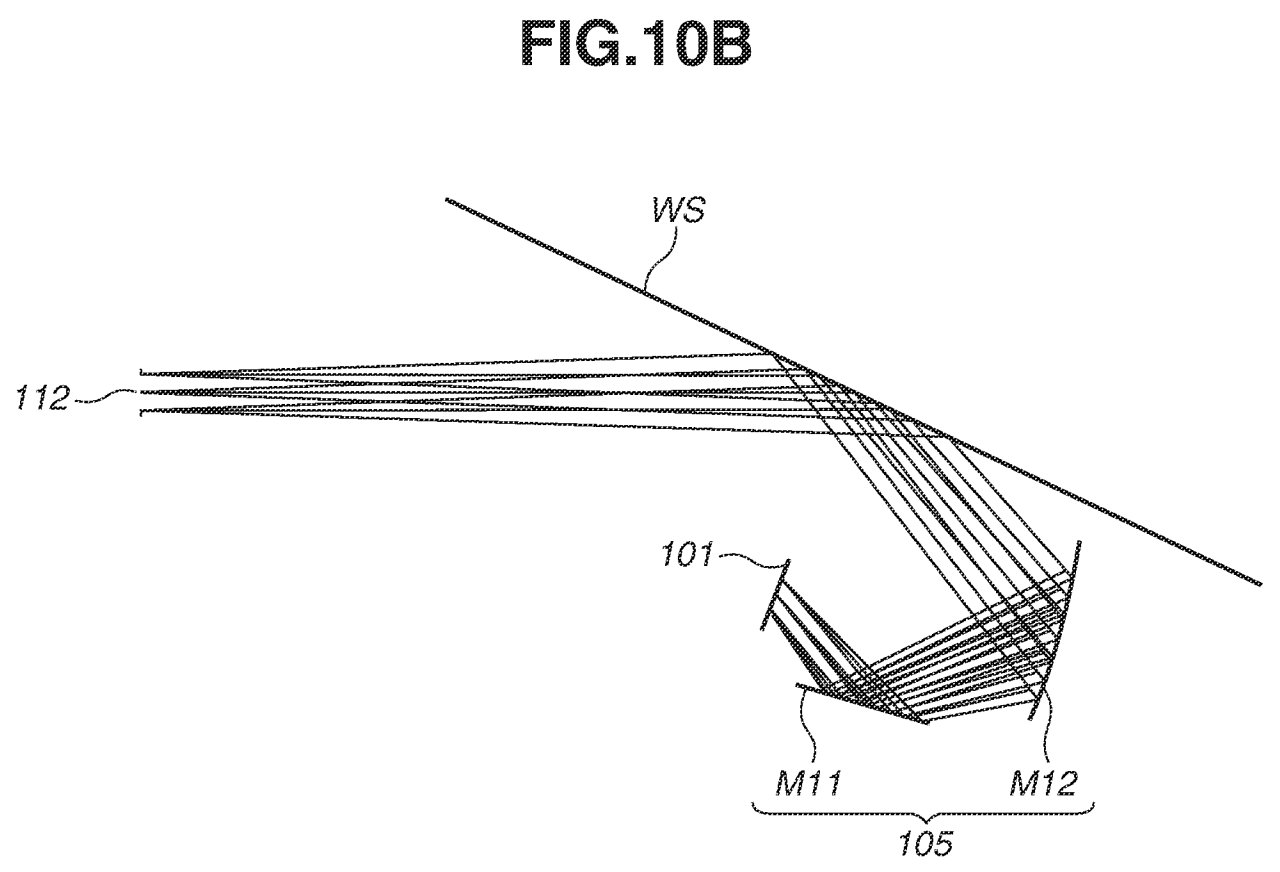
Figure 11A:
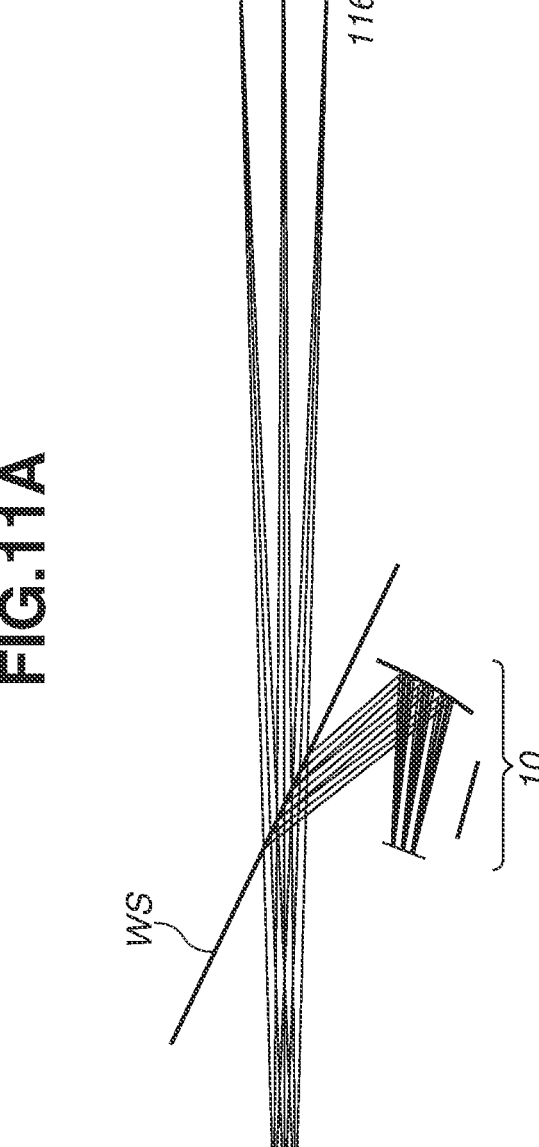
FIG. 11A is a schematic view of a major part of a virtual image display device according to the first numerical example (second state).
Figure 11B:
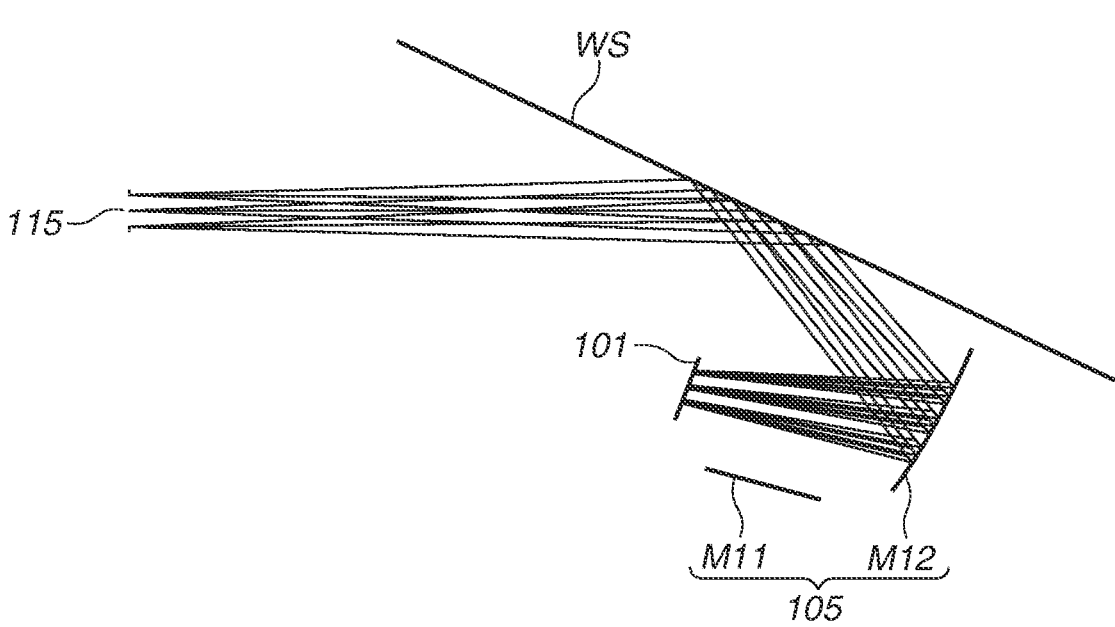
FIG. 11B is a schematic view of the major part of the virtual image display device according to the first numerical example (second state).

FIGS. 10A and 10B and FIGS. 11A and 11B are schematic views of a major part of a virtual image display device 10 according to a first numerical example. FIG. 10A illustrates an optical path for light from the virtual image display device 10 in the first state to reach the first pupil 112 via the windshield WS, and an imaginary optical path when light from the virtual image display device 10 forms the first virtual image 113. FIG. 10B is an enlarged view of the optical path from the virtual image display device 10 illustrated in FIG. 10A to the first pupil 112. FIG. 11A illustrates an optical path for light from the virtual image display device 10 in the second state to reach the second pupil 115 via the windshield WS, and an imaginary optical path when the light from the virtual image display device 10 forms the second virtual image 116. FIG. 11B is an enlarged view of the optical path from the virtual image display device 10 illustrated in FIG. 11A to the second pupil 115.

The virtual image optical system 105 according to the present numerical example is composed of a first reflective element (first mirror) M11 including the first reflective element 102, and a second reflective element (second mirror) M12 including the second reflective element 103. The virtual image display device 10 according to the present numerical example decenters the second reflective element M12, thereby making it possible to switch the positions of the first pupil 112 and the second pupil 115 to each other.

Figure 12:
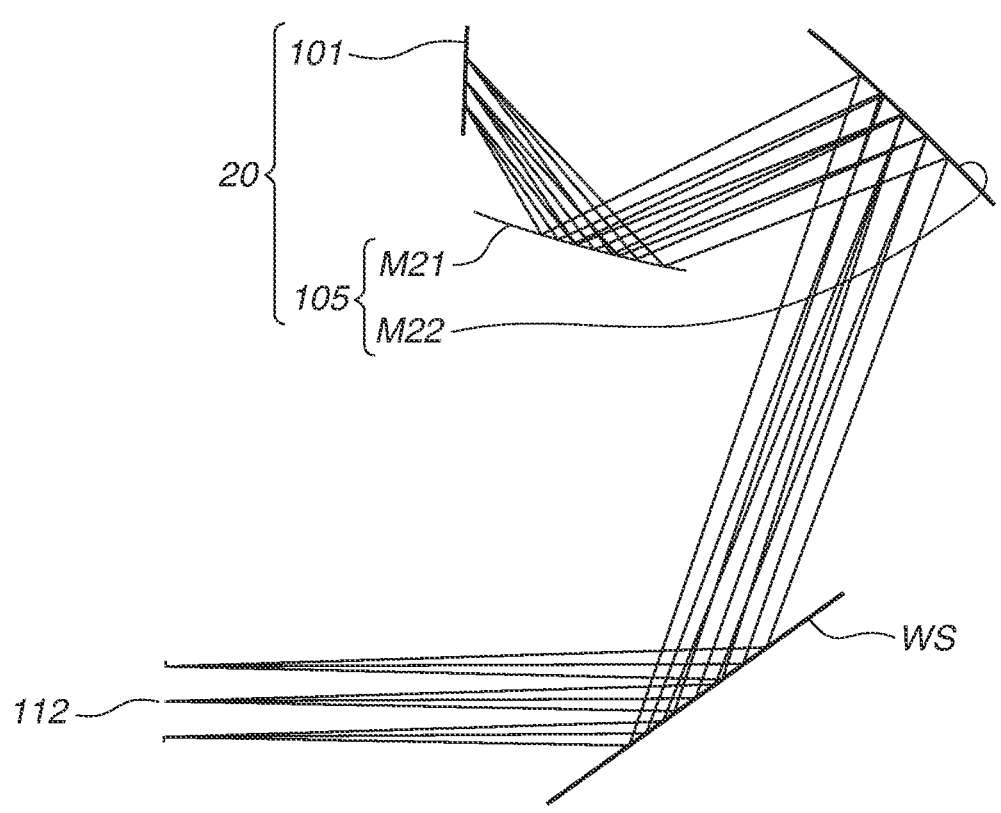
FIG. 12 is a schematic view of a major part of a virtual image display device according to a second numerical example (first state).
Figure 13:
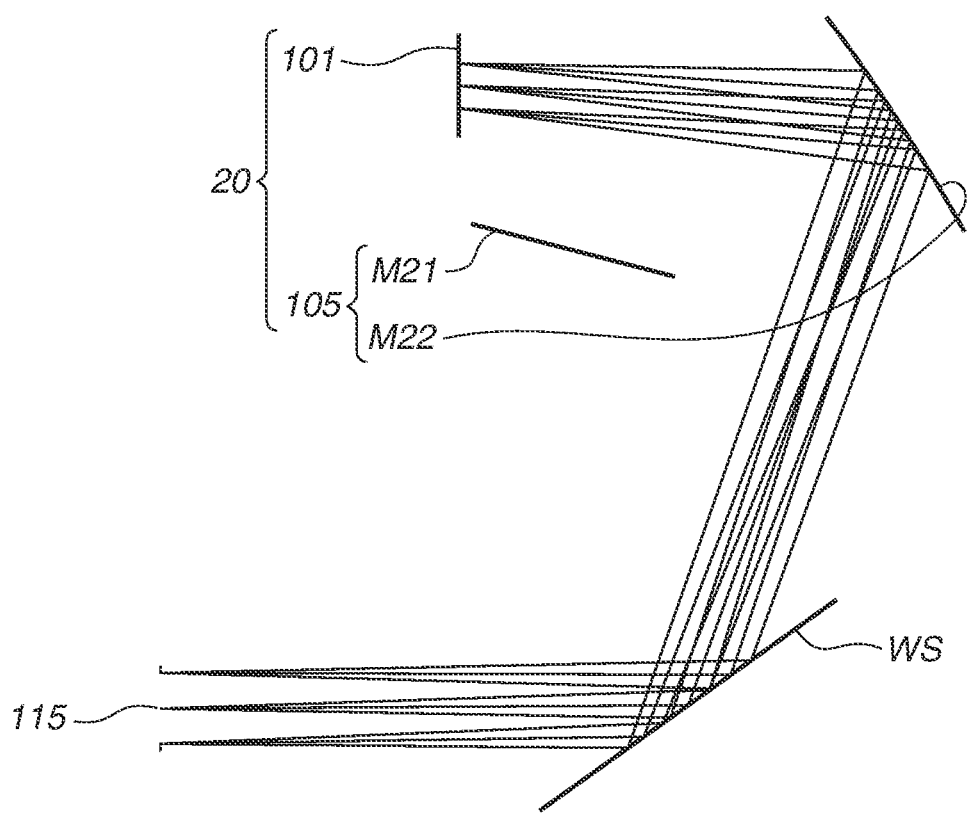
FIG. 13 is a schematic view of the major part of the virtual image display device according to the second numerical example (second state).

FIGS. 12 and 13 are schematic views of a major part of a virtual image display device 20 according to a second numerical example. FIG. 12 illustrates an optical path for light from the virtual image display device 20 in the first state to reach the first pupil 112 via the windshield WS. FIG. 13 illustrates an optical path for light from the virtual image display device 20 in the second state to reach the second pupil 115 via the windshield WS.

The virtual image optical system 105 according to the present numerical example is composed of a first reflective element (first mirror) M21 including the first reflective element 102, and a second reflective element (second mirror) M22 including the second reflective element 103. The virtual image display device 20 according to the present numerical example decenters the second reflective element M22, thereby making it possible to switch the positions of the first pupil 112 and the second pupil 115 to each other.

Figure 14:
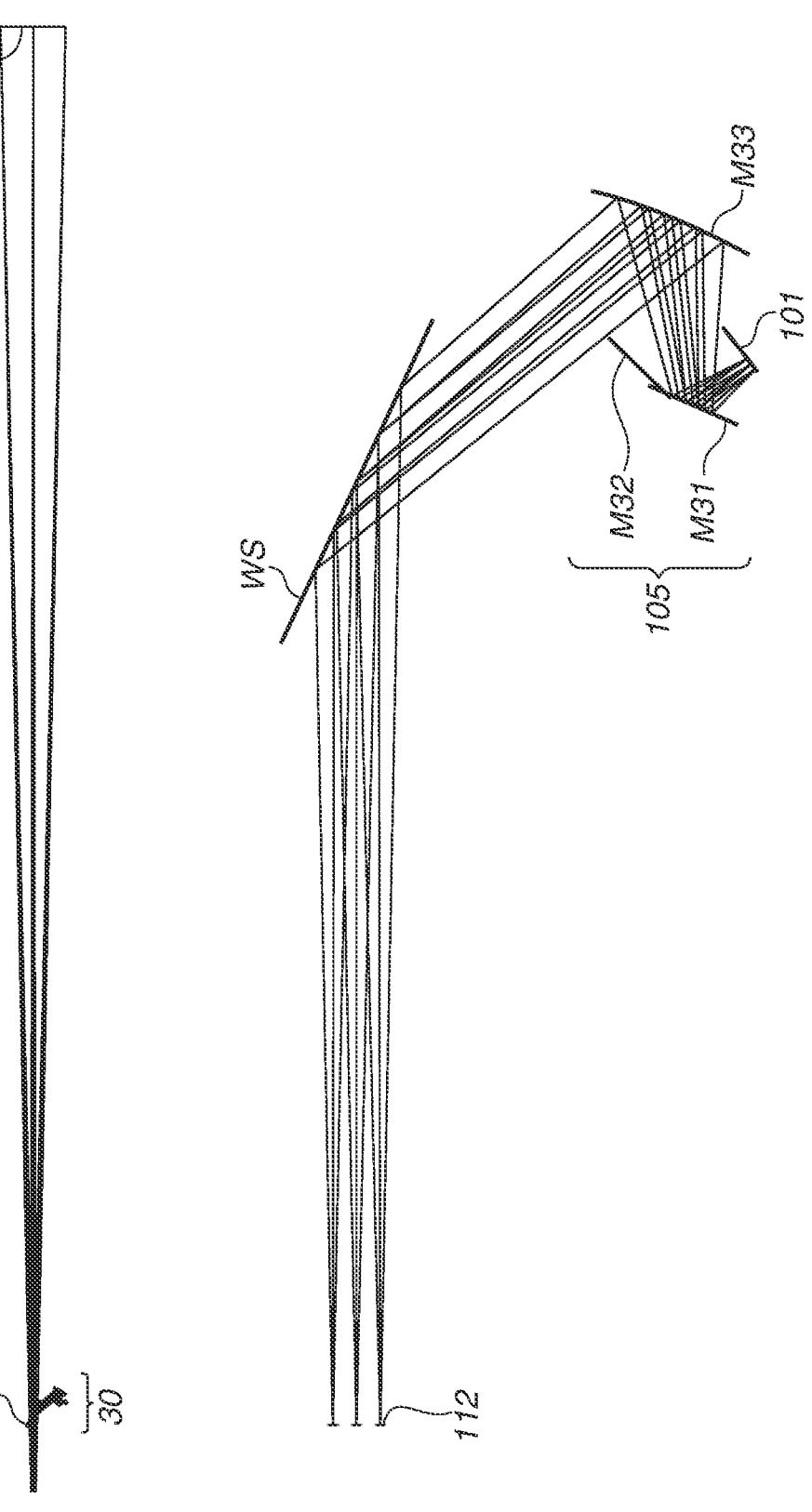
FIG. 14 is a schematic view of a major part of a virtual image display device according to a third numerical example (first state).
Figure 15:
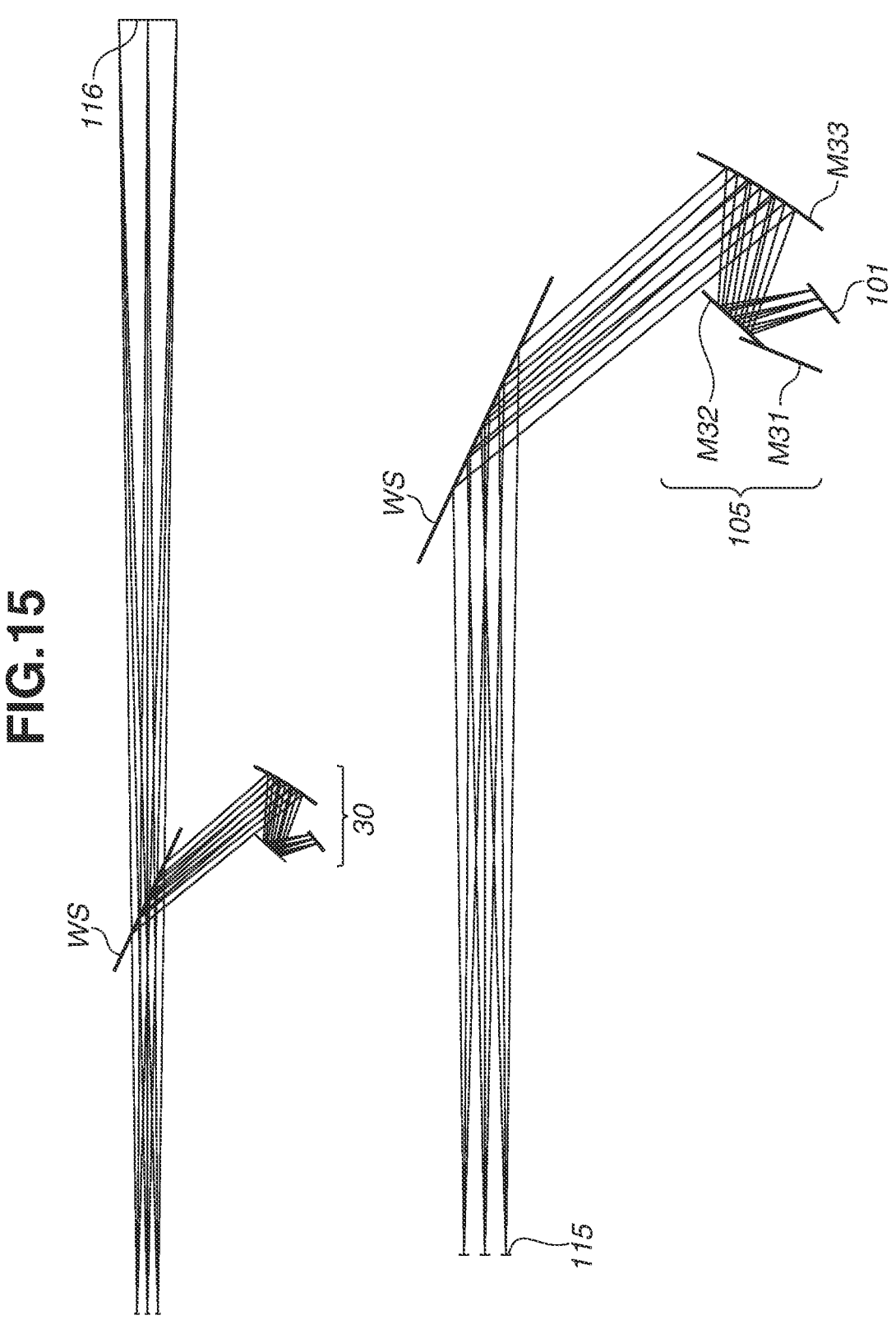
FIG. 15 is a schematic view of the major part of the virtual image display device according to the third numerical example (second state).

FIGS. 14 and 15 are schematic views of a major part of a virtual image display device 30 according to a third numerical example. An upper illustration of FIG. 14 illustrates an optical path for light from the virtual image display device 30 in the first state to reach the first pupil 112 via the windshield WS, and an imaginary optical path when the light from the virtual image display device 30 forms the first virtual image 113. A lower illustration of FIG. 14 is an enlarged view of the optical path from the virtual image display device 30 illustrated in the upper illustration of FIG. 14 to the first pupil 112. An upper illustration of FIG. 15 illustrates an optical path for light from the virtual image display device 30 in the second state to reach the second pupil 115 via the windshield WS, and an imaginary optical path when the light from the virtual image display device 30 forms the second virtual image 116. A lower illustration of FIG. 15 is an enlarged view of the optical path from the virtual image display device 30 illustrated in the upper illustration of FIG. 15 to the second pupil 115.

The virtual image optical system 105 according to the present numerical example is composed of a first reflective element (first mirror) M31 including the first reflective surface, a second reflective element (second mirror) M32 including the second reflective surface, and a third refractive element (third mirror) M33 including the third reflective surface. The virtual image display device 30 according to the present numerical example decenters the third refractive element M33, thereby making it possible to switch the positions of the first pupil 112 and the second pupil 115 to each other.

Figure 16:
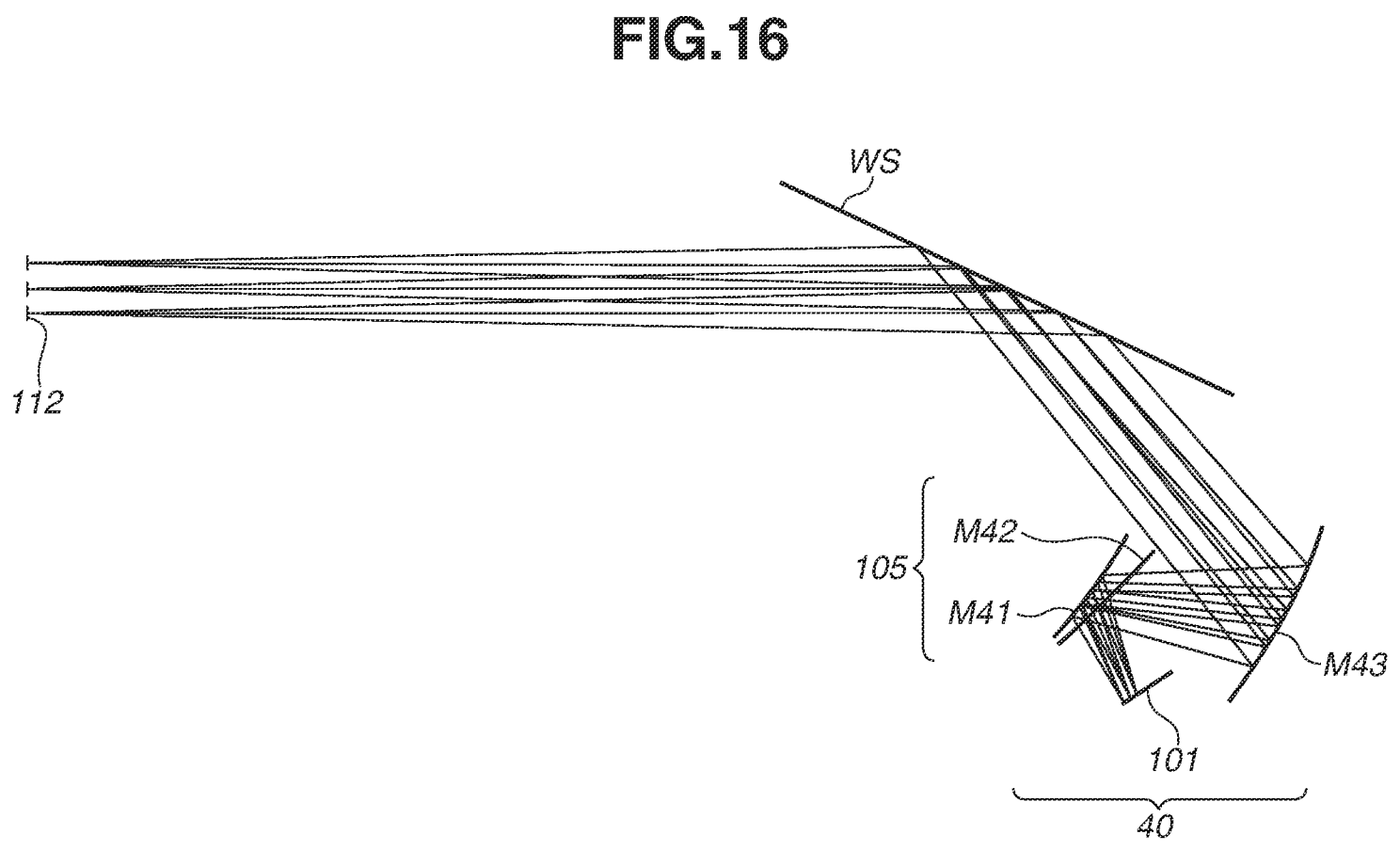
Figure 17:
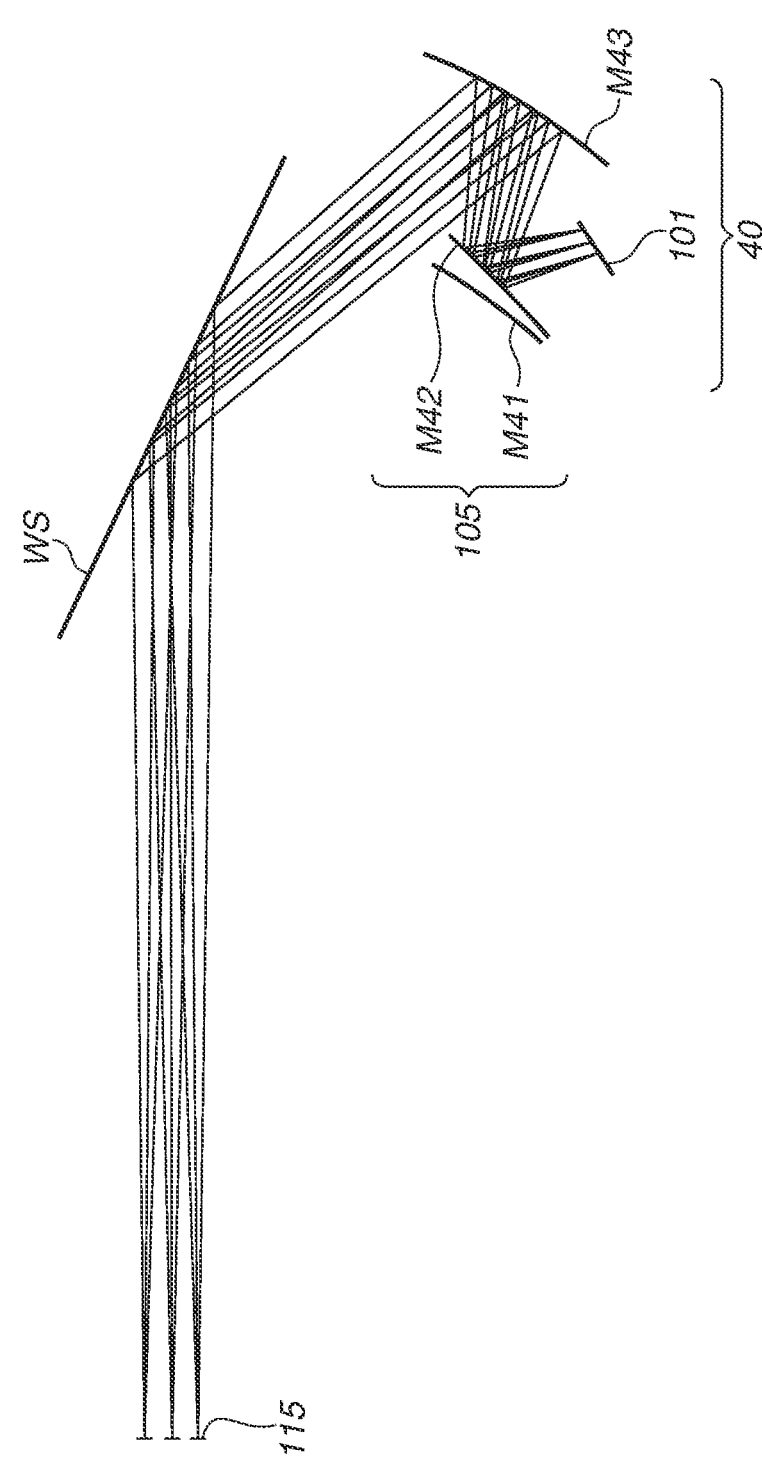
FIG. 17 is a schematic view of a major part of a virtual image display device according to the fourth numerical example (second state).

FIGS. 16 and 17 are schematic views of a major part of a virtual image display device 40 according to a fourth numerical example. FIG. 16 illustrates an optical path for light from the virtual image display device 40 in the first state to reach the first pupil 112 via the windshield WS. FIG. 17 illustrates an optical path for light from the virtual image display device 40 in the second state to reach the second pupil 115 via the windshield WS.

The virtual image optical system 105 according to the present numerical example is composed of a first reflective element (first mirror) M41 including the first reflective surface, a second reflective element (second mirror) M42 including the reflective/transmissive surface, and a third refractive element (third mirror) M43 including the third reflective surface. In the present numerical example, the light corresponding to the first pupil 112 is transmitted through the second reflective element M42 and is reflected by the first reflective element M41, and is then transmitted through the second reflective element M42 again and is directed toward the third refractive element M43. The virtual image display device 40 according to the present numerical example decenters the third refractive element M43, thereby making it possible to switch the positions of the first pupil 112 and the second pupil 115 to each other. The virtual image optical system 105 according to the first and second numerical examples switches the positions of the pupils by decentering the reflective element, but instead may switch the positions of the pupils by decentering the refractive element as described above.

Numeric data according to the above-described first to fourth numerical examples will be described below. In each numerical example, Surface Number represents the number "i" of the surface counted from the reduction side, and R represents a curvature radius [mm] of an i-th surface.

The virtual image optical system 105 according to each numerical example is an off-axial optical system. The optical axis (reference axis) of the virtual image optical system 105 is different between the first state and the second state. Accordingly, an absolute coordinate system XYZ with the center of each of the first and second pupils as an origin is defined to represent the position and eccentric angle of each surface. Specifically, the normal line at the origin is defined as a Z-axis and the direction from the object plane to the image side is defined as a positive direction (+Z-direction). An axis that passes through the origin and forms 90° in a counterclockwise direction with respect to the Z-axis according to the definition of a right-handed coordinate system is defined as a Y-axis. An axis that passes through the origin and is perpendicular to each of the Z-axis and the Y-axis is defined as an X-axis, and a direction toward the back with respect to the paper surface of each drawing is defined as a positive direction (+X-direction).

In each numerical example, when the reflective surface has a concave shape with respect to the reduction side (−Z-side) in the absolute coordinate system, the sign of the curvature radius R of the reflective surface is plus, and when the reflective surface has a convex shape, the sign of the curvature radius R is minus. In each numerical example, Y and Z [mm] represent coordinates in the Y-direction and the Z-direction, respectively, of a surface vertex of each surface in the absolute coordinate system, and θ [degrees] represents an inclination (eccentric angle) of the normal line at the surface vertex of each surface when a direction of counterclockwise rotation relative to the X-axis is positive.

Next, a local coordinate system xyz with an intersection between each surface and the Z-axis (reference axis) as an origin is defined to represent the shape of each surface. Specifically, the normal line at the origin is defined as a z-axis. An axis that passes through the origin and forms 90° in the counterclockwise direction with respect to the z-axis according to the definition of the right-handed coordinate system is defined as a y-axis. An axis that passes through the origin and is perpendicular to each of the z-axis and the y-axis is defined as an x-axis, and a direction toward the back with respect to the paper surface of FIG. 1 is defined as a positive direction (+x-direction). The shape of an aspheric surface is expressed by the following formula where a conic constant is represented by K, an aspheric surface coefficient is represented by $C_{ij}$, and a paraxial curvature radius is represented by R. In each numerical example, "E±N" in the values of the conic constant K and the aspheric surface coefficient $C_{ij}$ indicates "$\times 10^{\pm N}$".

$$z = \frac{\frac{h^2}{R}}{1 + \sqrt{1 - (1+K)\left(\frac{h}{R}\right)^2}} + \sum\sum c_{ij}x^i y^j \qquad \text{[Formula 1]}$$

Note, however, that "h" is expressed by the following formula.

$$h = \sqrt{x^2 + y^2} \qquad \text{[Formula 2]}$$

First Numerical Example

| Surface Number | | R | Y | Z | θ |
|---|---|---|---|---|---|
| Surface Data (First State) | | | | | |
| 1 | 113 | ∞ | 0.00 | 10000.00 | −85.0 |
| 2 | 112 | ∞ | 0.00 | 0.00 | 0.0 |
| 3 | WS (flat surface) | ∞ | 0.00 | 800.00 | 65.0 |
| 4 | M12 (reflection) | ∞ | −268.07 | 1032.00 | 165.1 |
| 5 | M11 (reflection) | ∞ | −346.73 | 811.01 | −105.2 |
| 6 | 101 | ∞ | −224.79 | 713.79 | −21.4 |
| Surface Data (Second State) | | | | | |
| 1 | 116 | ∞ | 0.00 | 2500.00 | 0.0 |
| 2 | 115 | ∞ | 0.00 | 0.00 | 0.0 |
| 3 | WS (flat surface) | ∞ | 0.00 | 800.00 | 65.0 |
| 4 | M11 (reflection) | ∞ | −268.07 | 1032.00 | 151.2 |
| 5 | 101 | ∞ | −224.79 | 713.79 | −21.4 |

| Aspheric Surface Data | | |
|---|---|---|
| | M12 | M11 |
| K | 0.00E+00 | 0.00E+00 |
| C20 | 6.62E−04 | −4.76E−04 |
| C02 | 6.00E−04 | 3.58E−04 |
| C21 | 1.68E−07 | 1.96E−06 |
| C03 | 4.75E−07 | 8.29E−07 |
| C40 | 2.28E−10 | 7.00E−10 |
| C22 | 2.41E−10 | −1.20E−08 |

-continued

| | | |
|---|---|---|
| C04 | -3.35E-09 | -5.42E-08 |
| C41 | 3.60E-12 | 6.42E-11 |
| C23 | -9.99E-12 | -1.39E-10 |
| C05 | 3.89E-11 | 4.15E-10 |
| C60 | 2.25E-18 | -1.71E-13 |
| C42 | 4.51E-15 | -4.44E-13 |
| C24 | 1.44E-14 | 2.20E-12 |
| C06 | -1.00E-13 | -7.71E-21 |
| C61 | 5.51E-21 | 5.23E-19 |
| C43 | -4.14E-20 | 2.13E-18 |
| C25 | 6.98E-19 | -1.01E-17 |
| C07 | 1.34E-18 | -8.00E-21 |

Second Numerical Example

| Surface Number | R | Y | Z | θ |
|---|---|---|---|---|
| Surface Data (First State) | | | | |
| 1 | 113 ∞ | 0.00 | 10000.00 | -87.0 |
| 2 | 112 ∞ | 0.00 | 0.00 | 0.0 |
| 3 | WS ∞ | 0.00 | 300.00 | -55.0 |
| 4 | M21 (reflection) ∞ | 328.89 | 419.71 | -133.6 |
| 5 | M22 (reflection) ∞ | 256.95 | 234.79 | -105.4 |
| 6 | 101 ∞ | 350.13 | 169.83 | -1.7 |
| Surface Data (Second State) | | | | |
| 1 | 116 ∞ | 0.00 | 2000.00 | 0.0 |
| 2 | 115 ∞ | 0.00 | 0.00 | 0.0 |
| 3 | WS ∞ | 0.00 | 300.00 | -55.0 |
| 4 | M21 (reflection) ∞ | 328.89 | 419.71 | -147.6 |
| 5 | 101 ∞ | 350.13 | 169.83 | -1.7 |

| Aspheric Surface Data | | |
|---|---|---|
| | WS | M12 | M11 |
| K | 0.00E+00 | 0.00E+00 | 0.00E+00 |
| C20 | -2.27E-04 | 6.85E-04 | 3.61E-04 |
| C02 | -6.75E-05 | 4.38E-04 | -5.26E-04 |
| C21 | -9.67E-08 | -7.37E-07 | -2.16E-06 |
| C03 | -6.07E-08 | -6.30E-07 | 2.06E-06 |
| C40 | -7.05E-10 | 4.46E-10 | 1.40E-10 |
| C22 | -7.40E-10 | 1.68E-09 | 1.56E-08 |
| C04 | 1.22E-09 | 1.04E-08 | 1.55E-09 |
| C41 | 2.06E-12 | 1.59E-12 | 5.89E-11 |
| C23 | 6.32E-13 | 2.25E-12 | 2.04E-10 |
| C05 | -1.08E-12 | -2.64E-11 | -9.95E-12 |
| C60 | 6.49E-14 | 0.00E+00 | 0.00E+00 |
| C42 | 1.12E-13 | 3.38E-14 | -1.72E-12 |
| C24 | -8.92E-14 | -1.07E-12 | -3.53E-12 |
| C06 | 0.00E+00 | -4.53E-13 | -3.91E-13 |

Third Numerical Example

| Surface Number | R | Y | Z | θ |
|---|---|---|---|---|
| Surface Data (First Mode) | | | | |
| 1 | 113 ∞ | 0.00 | -15000.00 | 0.0 |
| 2 | 112 ∞ | 0.00 | 0.00 | 0.0 |
| 3 | WS (flat surface) ∞ | 0.00 | 800.00 | 65.0 |
| 4 | M33 (reflection) ∞ | -268.12 | 224.98 | 158.0 |
| 5 | M31 (reflection) ∞ | -284.84 | 65.85 | 155.4 |
| 6 | 101 ∞ | -325.00 | 113.07 | 128.6 |
| Surface Data (Second Mode) | | | | |
| 1 | 116 ∞ | 0.00 | -2500.00 | 0.0 |
| 2 | 115 ∞ | 0.00 | 0.00 | 0.0 |
| 3 | WS (flat surface) ∞ | 0.00 | 800.00 | 65.0 |

-continued

| | | | | |
|---|---|---|---|---|
| 4 | M33 (reflection) ∞ | -268.12 | 224.98 | 149.0 |
| 5 | M32 (reflection) ∞ | -241.09 | 97.82 | 136.0 |
| 6 | 101 ∞ | -325.00 | 113.07 | 128.6 |

| Aspheric Surface Data | | |
|---|---|---|
| | M31 | M32 | M33 |
| K | 0.00E+00 | 0.00E+00 | 0.00E+00 |
| C02 | 5.39E-04 | 1.33E-04 | 1.01E-03 |
| C03 | 1.51E-06 | -1.28E-05 | 4.12E-07 |
| C04 | 5.13E-09 | -1.20E-07 | -1.62E-09 |
| C05 | 0.00E+00 | 0.00E+00 | 5.78E-11 |
| C06 | 0.00E+00 | 0.00E+00 | -4.65E-14 |
| C20 | 5.87E-04 | -1.40E-03 | 1.12E-03 |
| C21 | 1.35E-06 | -4.46E-06 | 3.59E-07 |
| C22 | -2.07E-09 | -1.26E-08 | 3.09E-09 |
| C23 | 0.00E+00 | 0.00E+00 | 1.57E-12 |
| C24 | 0.00E+00 | 0.00E+00 | 2.83E-13 |
| C40 | 8.08E-11 | 1.40E-08 | 1.42E-09 |
| C41 | 0.00E+00 | 0.00E+00 | 5.78E-12 |
| C42 | 0.00E+00 | 0.00E+00 | -2.66E-14 |
| C60 | 0.00E+00 | 0.00E+00 | -7.39E-15 |

Fourth Numerical Example

| Surface Number | R | Y | Z | θ |
|---|---|---|---|---|
| Surface Data (First Mode) | | | | |
| 1 | 113 ∞ | 0.00 | 15000.00 | 0.0 |
| 2 | 112 ∞ | 0.00 | 0.00 | 0.0 |
| 3 | WS (flat surface) ∞ | 0.00 | -800.00 | 65.0 |
| 4 | M43 (reflection) ∞ | -268.12 | 224.98 | 152.0 |
| 5 | M41 (reflection) ∞ | -251.39 | 65.85 | 143.4 |
| 6 | 101 ∞ | -325.00 | 114.34 | 121.4 |
| Surface Data (Second Mode) | | | | |
| 1 | 116 ∞ | 0.00 | 2500.00 | 0.0 |
| 2 | 115 ∞ | 0.00 | 0.00 | 0.0 |
| 3 | WS (flat surface) ∞ | 0.00 | -800.00 | 65.0 |
| 4 | M43 (reflection) ∞ | -268.12 | 224.98 | 149.0 |
| 5 | M42 (reflection) ∞ | -241.09 | 97.82 | 136.0 |
| 6 | 101 ∞ | -325.00 | 114.34 | 121.4 |

| Aspheric Surface Data | |
|---|---|
| | M41, M42 | M43 |
| K | 0.00E+00 | 0.00E+00 |
| C02 | 5.42E-04 | 9.88E-04 |
| C03 | 1.52E-06 | 5.58E-07 |
| C04 | 5.03E-09 | 1.98E-09 |
| C05 | 0.00E+00 | 2.79E-11 |
| C06 | 0.00E+00 | -5.12E-13 |
| C20 | 6.00E-04 | 1.12E-03 |
| C21 | 1.45E-06 | 4.46E-07 |
| C22 | -2.00E-09 | 2.31E-09 |
| C23 | 0.00E+00 | -7.72E-13 |
| C24 | 0.00E+00 | 1.10E-13 |
| C40 | 0.00E+00 | 1.36E-09 |
| C41 | 0.00E+00 | 5.61E-12 |
| C42 | 0.00E+00 | -1.83E-14 |
| C60 | 0.00E+00 | -4.20E-15 |

Figure 18:
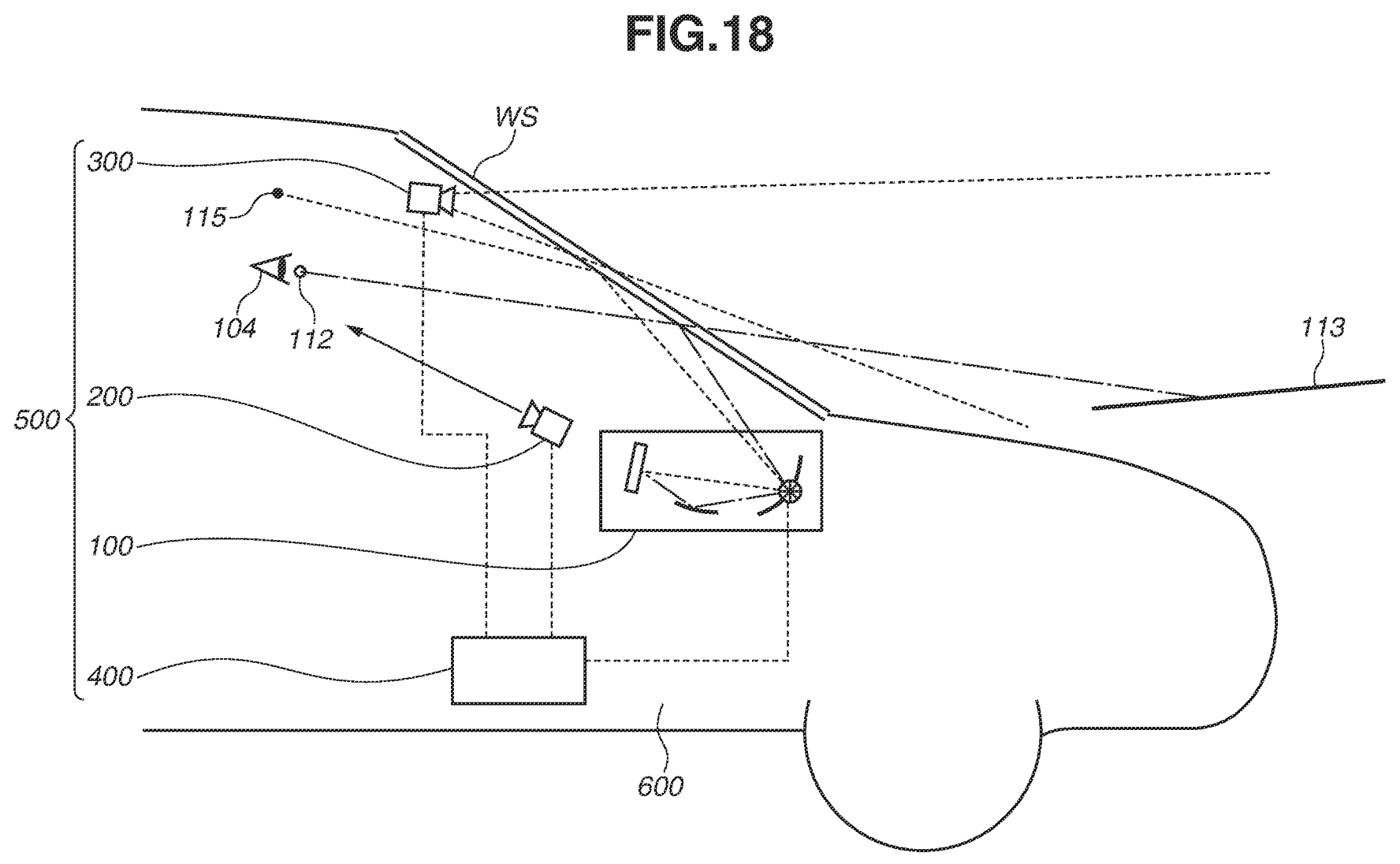

FIG. 18 is a schematic view of an on-vehicle system 500 including the virtual image display device 100 and a movable apparatus 600 according to the present exemplary embodiment. The on-vehicle system 500 is a system that includes the virtual image display device 100, a first obtaining means 200, a second obtaining means 300, and a control means 400, and assists a user (occupant, driver) of the movable apparatus 600. The movable apparatus 600 is a movable body, such as an automobile, a ship, or an aircraft, which can move while holding the on-vehicle system 500 described above. FIG. 18 illustrates an automobile (vehicle) as an example of the movable apparatus 600.

The first obtaining means 200 is a means of obtaining at least one of positional information and viewpoint information about the user and is, for example, an imaging device such as a camera. The positional information about the user is information about a position of at least a part of the user and is, for example, information about the position of the user's eye 104. The viewpoint information about the user is information about a viewpoint or line of sight of the user and is, for example, information about a motion of the user's eye 104 (pupil).

The second obtaining means 300 is a means of obtaining information about the outside world (surrounding information) including obstacles (pedestrians, other vehicles, etc.) around the movable apparatus 600, a surrounding environment (landscape), and the like, and is, for example, an imaging device such as a camera. The second obtaining means 300 according to the present exemplary embodiment is disposed to obtain information about the outside world in front of the movable apparatus 600, but instead may be disposed to obtain information about the outside world on the rear side, the lateral side, or the like of the movable apparatus 600.

The control means 400 is a means of controlling the virtual image display device 100 and is, for example, a processor such as a CPU. The control means 400 can control display of an image by the display means 101 in the virtual image display device 100, and control decentering of the reflective surface by the driving means 106. For example, the control means 400 can control the display of an image by the display means 101 and the decentering of the reflective surface by the driving means 106 based on at least one of information obtained by the first obtaining means 200 and information obtained by the second obtaining means 300. The control means 400 may be provided in the virtual image display device 100.

The first obtaining means 200 obtains at least one of the positional information and the viewpoint information about the user, thereby making it possible to detect a shift amount of the position of the user's eye 104 relative to the movable apparatus 600. The control means 400 obtains a driving amount (decentering amount) of the second reflective element 103 in the virtual image display device 100 based on the information obtained by the first obtaining means 200, and controls the driving means 106 based on the driving amount to thereby decenter the second reflective element 103. This makes it possible to correct a shift in the relative position between the user's eye 104 and the pupil of the virtual image display device 100.

Further, the control means 400 may switch between virtual images to be visually recognized by the user by controlling decentering of the second reflective element 103 based on information (speed information) about a moving speed of the movable apparatus 600. The display of the first virtual image 113 seen at a far distance and the display of the second virtual image 116 seen at a near distance are switched so as to allow the user to visually recognize as if the position of the virtual image in a traveling direction of the movable apparatus 600 has been switched. For example, when the movable apparatus 600 is moving at a first speed, the first virtual image 113 may be displayed, and when the movable apparatus 600 is moving at a second speed higher than the first speed, the second virtual image 116 may be displayed. Specifically, the first virtual image 113 is displayed when the movable apparatus 600 is moving at a low speed or stops (at a speed of 0), and the second virtual image 116 is displayed when the movable apparatus 600 is moving at a high speed, thereby it is possible to satisfactorily superimpose each virtual image on the outside world. Consequently, the visibility of each virtual image when the speed of the movable apparatus 600 has changed can be improved.

The user may operate the operation means (not illustrated) to allow the control means 400 to control decentering of the second reflective element 103 by the driving means 106 based on a signal output from the operation means. Even in a case where the first obtaining means 200 obtains information about a position other than the user's eye 104, the control means 400 can obtain the shift amount of the position of the user's eye 104 with respect to the movable apparatus 600 based on the information.

The control means 400 also has a function as a determination means of determining a possibility of collision with an obstacle (object). For example, the control means 400 determines the possibility of collision between the movable apparatus 600 and an obstacle based on the information about the outside world obtained by the second obtaining means 300. If the control means 400 determines that there is the possibility of collision with an obstacle, for example, a warning can be issued to the user by displaying a warning message or the like on the virtual image display device 100.

If the control means 400 determines that there is the possibility of collision with an obstacle, the control means 400 may control a movement of the movable apparatus 600, or may issue a warning to each unit of the movable apparatus 600. For example, the control means 400 can control the movement of the movable apparatus 600 by outputting a control signal to a driving unit (an engine, a motor, or the like) of the movable apparatus 600. Examples of a control method include applying a brake, releasing an accelerator, turning a steering wheel, and suppressing an output from the driving unit by generating a control signal for generating a braking force on each wheel in the movable apparatus 600. Examples of a warning method include issuing an alarm to the user, displaying warning information on a screen of a car navigation system or the like, and applying a vibration to a seat belt or a steering wheel.

While the preferred exemplary embodiments and examples of the present invention have been described above, the present invention is not limited to these exemplary embodiments and examples. Various combinations, modifications, and changes can be made within the gist of the invention.

For example, the on-vehicle system 500 according to the above-described exemplary embodiment includes a single first obtaining means 200 and a single second obtaining means 300, but instead may include a plurality of first obtaining means 200 and a plurality of second obtaining means 300. Alternatively, a single obtaining means having both of the functions of the first obtaining means 200 and the second obtaining means 300 may be adopted. Instead of using the first obtaining means 200 and the second obtaining means 300, a means that detects a vibration, an acceleration, or the like of the movable apparatus 600 may be provided to control the virtual image display device 100 based on information obtained by the means.

The present invention is not limited to the above-described exemplary embodiments, and various modifications and alterations can be made without departing from the spirit and scope of the present invention. Accordingly, the following claims are attached to publicize the scope of the present invention.

With the present invention, it is possible to provide a virtual image optical system capable of achieving excellent visibility with a simple configuration.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

The invention claimed is:

1. A virtual image display device comprising:
a display unit; and
first and second optical elements each configured to guide light from the display unit,
wherein the second optical element guides the light from the display unit to a first pupil to form a first virtual image, and the second optical element simultaneously guides the light from the display unit to a second pupil to form a second virtual image,
wherein switching between a first state and a second state is enabled by physically moving the second optical element to cause decentering, wherein the second optical element is a reflective element or a refractive element,
wherein, in the first state, a user is able to visually recognize the first virtual image, and is unable to visually recognize the second virtual image, and
wherein, in the second state, the user is able to visually recognize the second virtual image, and is unable to visually recognize the first virtual image.

2. The virtual image display device according to claim 1, wherein the decentering of the second optical element enables the positions of the first pupil and the second pupil to be moved in a direction including a component of a direction perpendicular to a reference axis.

3. The virtual image display device according to claim 1, wherein the decentering of the second optical element enables a reflection angle of the light from the display unit with respect to the second optical element to be changed.

4. The virtual image display device according to claim 1, wherein a distance from the first pupil to the first virtual image is longer than a distance from the second pupil to the second virtual image.

5. The virtual image display device according to claim 1, wherein the first virtual image is non-perpendicular to a straight line connecting a center of the first pupil and a center of the first virtual image.

6. The virtual image display device according to claim 1, wherein the first optical element and the second optical element guide the light from the display unit to the first pupil to form the first virtual image, and the second optical element guides the light from the display unit to the second pupil without using the first optical element to form the second virtual image.

7. The virtual image display device according to claim 1, further comprising a actuator configured to cause the second optical element to be decentered.

8. The virtual image display device according to claim 7, wherein the actuator causes the second optical element to be decentered to adjust at least one of a relative position between the first pupil and a user's eye and a relative position between the second pupil and the user's eye.

9. The virtual image display device according to claim 7, wherein the actuator causes the second optical element to be decentered based on at least one of positional information and viewpoint information about the user.

10. An on-vehicle system comprising:
the virtual image display device according to claim 1,
wherein the on-vehicle system is held by a movable apparatus.

11. The on-vehicle system according to claim 10, further comprising:
a first obtaining unit configured to obtain at least one of the positional information and the viewpoint information about the user,
wherein the actuator causes the second optical element to be decentered based on the information obtained by the first obtaining unit.

12. The on-vehicle system according to claim 10, wherein the actuator causes the second optical element to be decentered based on information about a moving speed of the movable apparatus.

13. The on-vehicle system according to claim 12,
wherein a distance from the first pupil to the first virtual image is longer than a distance from the second pupil to the second virtual image, and
wherein the actuator causes the second optical element to be decentered so that, in a case where the movable apparatus is moving at a first speed, the user is able to visually recognize the first virtual image and, in a case where the movable apparatus is moving at a second speed higher than the first speed, the user is able to visually recognize the second virtual image.

14. The on-vehicle system according to claim 10, further comprising a second obtaining unit configured to obtain information about an outside world.

15. The on-vehicle system according to claim 14, further comprising a determination unit configured to determine a possibility of collision between the movable apparatus and an object based on the information obtained by the second obtaining unit.

16. The on-vehicle system according to claim 15, wherein, in a case where the determination unit determines that there is a possibility of collision between the movable apparatus and the object, the virtual image display device issues a warning to the user.

17. A movable apparatus comprising:
the virtual image display device according to claim 1,
wherein the movable apparatus is configured to move while holding the virtual image display device.

18. The movable apparatus according to claim 17, further comprising an optical member configured to reflect light from the virtual image display device toward a user.

19. The virtual image display device according to claim 1, wherein decentering of the second optical element enables switching between the first state and the second state is enabled by tilting or shifting the second optical element to cause decentering.

* * * * *